United States Patent
Mino et al.

(10) Patent No.: US 7,587,136 B2
(45) Date of Patent: Sep. 8, 2009

(54) IMAGE CAPTURING APPARATUS, IMAGE CAPTURING METHOD, OUTPUT APPARATUS, OUTPUT METHOD AND PROGRAM

(75) Inventors: Kazuhiro Mino, Kanagawa (JP); Akira Yoda, Kanagawa (JP); Yukita Gotohda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 472 days.

(21) Appl. No.: 11/359,517

(22) Filed: Feb. 23, 2006

(65) Prior Publication Data

US 2006/0193624 A1    Aug. 31, 2006

(30) Foreign Application Priority Data

| Feb. 25, 2005 | (JP) | ............................. | 2005-052026 |
| Mar. 25, 2005 | (JP) | ............................. | 2005-088698 |
| Dec. 14, 2005 | (JP) | ............................. | 2005-361061 |
| Dec. 15, 2005 | (JP) | ............................. | 2005-362465 |

(51) Int. Cl.
*G03B 17/24* (2006.01)
*H04N 5/76* (2006.01)
*H04N 5/00* (2006.01)
*H04N 5/222* (2006.01)

(52) U.S. Cl. ............... 396/312; 348/231.4; 348/333.05; 386/121

(58) Field of Classification Search ................. 396/312; 348/231.4, 333.05; 709/217; 345/1.3
See application file for complete search history.

(56) References Cited

U.S. PATENT DOCUMENTS

| 6,774,939 | B1 * | 8/2004 | Peng ........................ 348/231.4 |
| 7,113,981 | B2 * | 9/2006 | Slate .......................... 709/217 |
| 2004/0229611 | A1 * | 11/2004 | Chun .......................... 455/434 |
| 2006/0171671 | A1 * | 8/2006 | Kunita ......................... 386/83 |
| 2007/0053668 | A1 * | 3/2007 | Misawa et al. ............. 386/121 |
| 2007/0195010 | A1 * | 8/2007 | Toriumi et al. ............... 345/1.3 |

FOREIGN PATENT DOCUMENTS

JP    7-154734 A    6/1995

* cited by examiner

*Primary Examiner*—Melissa J Koval
(74) *Attorney, Agent, or Firm*—Birch, Stewart, Kolasch & Birch, LLP

(57) ABSTRACT

An output apparatus for outputting sounds associated with the captured images without boring sound repetitions with image repetitions. The image output apparatus has an image storage section storing a plurality of captured images, an image output control section controlling an image output section to output the stored images, a sound output control section selecting and causing a sound storage section storing a plurality of recorded sounds to output a first sound stored in the sound storage section when the image output section first outputs a particular image or particular images, and when the image output section outputs the particular image or particular images at a subsequent time, selecting and causing the output of a sound different from the first sound to reduce possible user boredom.

16 Claims, 24 Drawing Sheets

| SOUND ID | TIME | SOUND DATA | OPERATION MODE |
|---|---|---|---|
| #301 | 2000-12-09-13:30:00 | SOUND DATA 1 | STANDBY MODE |
| #302 | 2000-12-09-13:30:10 | SOUND DATA 2 | IMAGE CAPTURING MODE |
| #303 | 2000-12-09-13:30:20 | SOUND DATA 3 | OUTPUT MODE |
| ...... | ...... | ...... | ...... |
| #351 | 2004-12-10-16:10:00 | SOUND DATA 51 | STANDBY MODE |
| ...... | ...... | ...... | ...... |

220

| SOUND ID | TIME | INDEX | SOUND DATA |
|---|---|---|---|
| #301 | 2000-12-09-13:30:00 | 1 | SOUND DATA 1 |
| #302 | 2000-12-09-13:30:00 | 2 | SOUND DATA 2 |
| #303 | 2000-12-09-13:30:00 | 3 | SOUND DATA 3 |
| ⋮ | ⋮ | ⋮ | ⋮ |
| #351 | 2004-12-10-16:10:00 | 1 | SOUND DATA 51 |
| ⋮ | ⋮ | ⋮ | ⋮ |

| SOUND ID | TARGET NUMBER OF TIMES |
|---|---|
| #301 | 1000 |
| #302 | 500 |
| #303 | 300 |
| ⋮ | ⋮ |

| SOUND ID | OUTPUT RATIO |
|---|---|
| #301 | 10 |
| #302 | 5 |
| #303 | 3 |
| ⋮ | ⋮ |

| KIND | SOUND DATA |
|------|------------|
| DOG | SOUND DATA 11 |
| GULL | SOUND DATA 12 |
| ⋮ | ⋮ |

960

| IMAGE ID | POSITION IN THE TOTAL IMAGE | SOUND DATA |
|---|---|---|
| #AAA | (3/8, 1/2) | SOUND DATA 11 |
| #AAA | (5/8, 1/2) | SOUND DATA 12 |
| #AAA | NULL | SOUND DATA 13 |
| ⋮ | ⋮ | ⋮ |
| #BBB | (1/8, 3/4) | SOUND DATA 21 |
| #BBB | NULL | SOUND DATA 22 |
| ⋮ | ⋮ | ⋮ |

FIG. 13

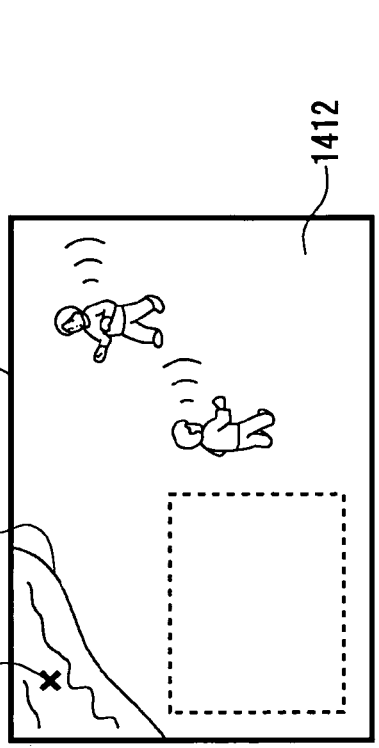
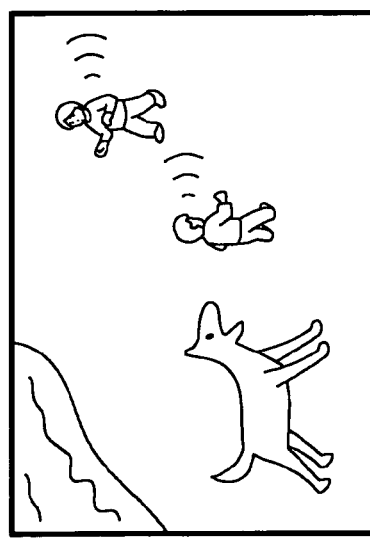
FIG. 14

170

| REGION | RANGE | | SOUND DATA | | |
|---|---|---|---|---|---|
| | STARTING POINT | END POINT | BRIEF DESCRIPTION DATA | ... | DETAILED DESCRIPTION DATA |
| JAPAN | STARTING POINT OF JAPAN (LATITUDE AND LONGITUDE) | END POINT OF JAPAN (LATITUDE AND LONGITUDE) | BRIEF DESCRIPTION (JAPAN) | ... | DETAILED DESCRIPTION (JAPAN) |
| KYUSYU | STARTING POINT OF KYUSYU (LATITUDE AND LONGITUDE) | END POINT OF KYUSYU (LATITUDE AND LONGITUDE) | BRIEF DESCRIPTION (KYUSYU) | ... | DETAILED DESCRIPTION (KYUSYU) |
| | | | | | |
| KINKI | STARTING POINT OF KINKI (LATITUDE AND LONGITUDE) | END POINT OF KINKI (LATITUDE AND LONGITUDE) | BRIEF DESCRIPTION (KINKI) | ... | DETAILED DESCRIPTION (KINKI) |
| OSAKA PRF | STARTING POINT OF OSAKA PRF (LATITUDE AND LONGITUDE) | END POINT OF OSAKA PRF (LATITUDE AND LONGITUDE) | BRIEF DESCRIPTION (OSAKA PRF) | ... | DETAILED DESCRIPTION (OSAKA PRF) |
| | | | | | |
| KYOTO PRF | STARTING POINT OF KYOTO PRF (LATITUDE AND LONGITUDE) | END POINT OF KYOTO PRF (LATITUDE AND LONGITUDE) | BRIEF DESCRIPTION (KYOTO PRF) | ... | DETAILED DESCRIPTION (KYOTO PRF) |
| KYOTO CITY | STARTING POINT OF KYOTO CITY (LATITUDE AND LONGITUDE) | END POINT OF KYOTO CITY (LATITUDE AND LONGITUDE) | BRIEF DESCRIPTION (KYOTO CITY) | ... | DETAILED DESCRIPTION (KYOTO CITY) |
| KINKAKUJI | STARTING POINT OF KINKAKUJI (LATITUDE AND LONGITUDE) | END POINT OF KINKAKUJI (LATITUDE AND LONGITUDE) | BRIEF DESCRIPTION (KINKAKUJI) | ... | DETAILED DESCRIPTION (KINKAKUJI) |
| | | | | | |

FIG. 17

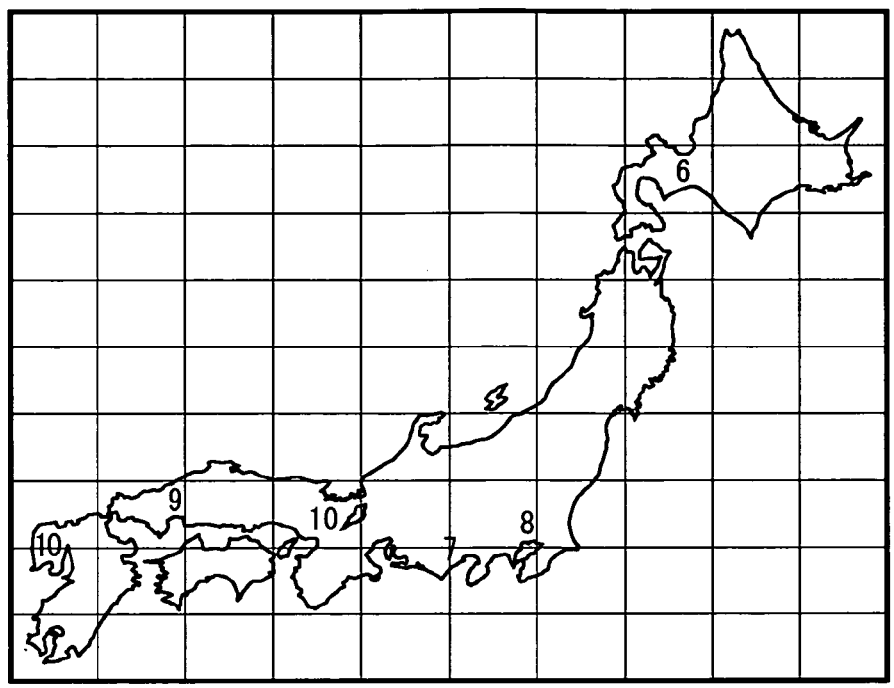
PROPORTIONAL DISTRIBUTION ⇒ OUTPUT DESCRIPTION ABOUT JAPAN
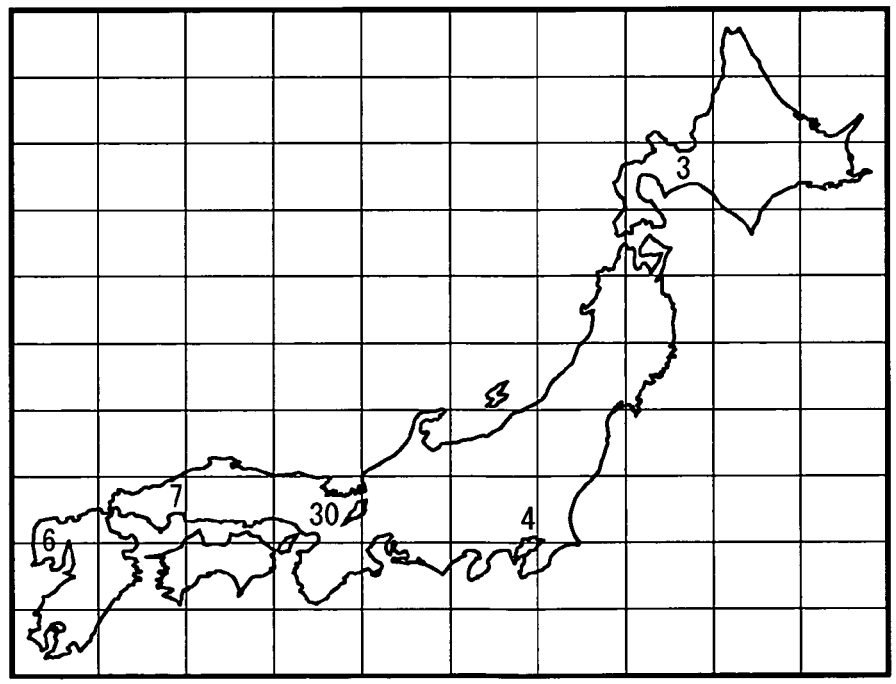
DISPROPORTIONAL DISTRIBUTION ⇒ OUTPUT DESCRIPTION ABOUT KYOTO
FIG. 18

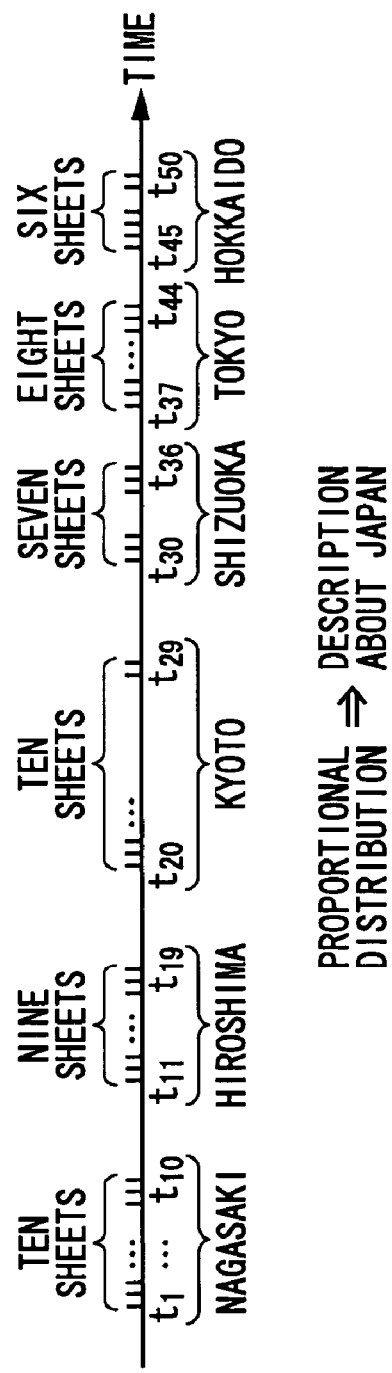
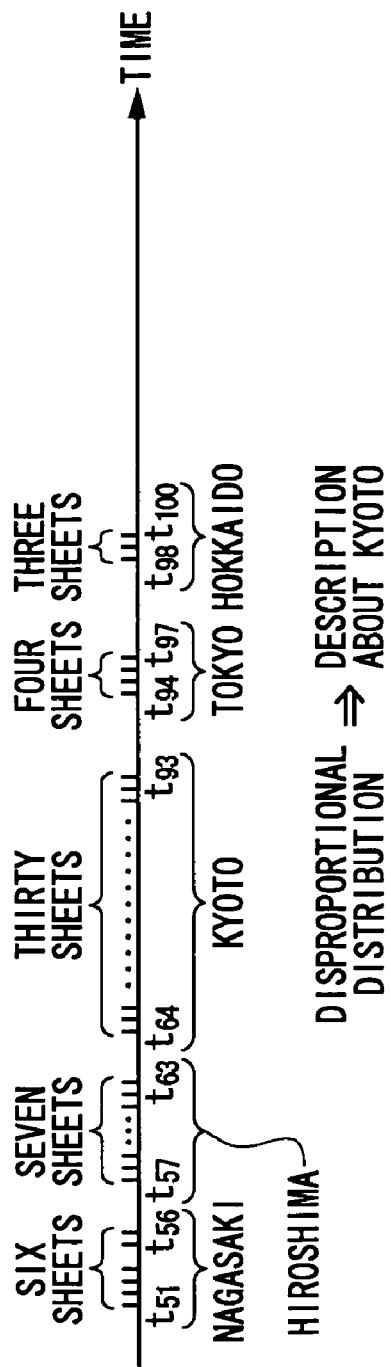
FIG. 19

| MUSIC ID | SOUND DATA | AGE | GENRE | RECORD COMPANY | LABEL | HIT DEGREE | RHYTHM | TEMPO | TONALITY | CHORD PROGRESSION | NOTE DATA |
|---|---|---|---|---|---|---|---|---|---|---|---|
| #701 | SOUND DATA 701 | 1960 | CLASSIC | RECORD COMPANY 701 | LABEL 701 | HIT DEGREE 701 | RHYTHM 701 | TEMPO 701 | TONALITY 701 | CHORD PROGRESSION 701 | NOTE DATA 701 |
| ... | ... | ... | ... | ... | ... | ... | ... | ... | ... | ... | ... |
| #711 | SOUND DATA 711 | 1970 | JAZZ | RECORD COMPANY 711 | LABEL 711 | HIT DEGREE 711 | RHYTHM 711 | TEMPO 711 | TONALITY 711 | CHORD PROGRESSION 711 | NOTE DATA 711 |
| ... | ... | ... | ... | ... | ... | ... | ... | ... | ... | ... | ... |
| #721 | SOUND DATA 721 | 1980 | ROCK | RECORD COMPANY 721 | LABEL 721 | HIT DEGREE 721 | RHYTHM 721 | TEMPO 721 | TONALITY 721 | CHORD PROGRESSION 721 | NOTE DATA 721 |
| ... | ... | ... | ... | ... | ... | ... | ... | ... | ... | ... | ... |

792

| PLAY LIST ID | MUSIC ID (ORDER) | SELECTION FREQUENCY | RECOMMENDATION DEGREE |
|---|---|---|---|
| #751 | #711(1) #721(2) ... | 30 | 8 |
| #752 | #701(1) ... | 15 | 4 |
| ... | ... | ... | ... |

793

| MUSIC ID (ORDER) | SELECTION FREQUENCY | RECOMMENDATION DEGREE |
|---|---|---|
| #701 | 40 | 9 |
| #711 | 10 | 3 |
| ... | ... | ... |

IMAGE CAPTURING APPARATUS, IMAGE CAPTURING METHOD, OUTPUT APPARATUS, OUTPUT METHOD AND PROGRAM

CROSS REFERENCE TO RELATED APPLICATION

The present application claims priority from Japanese Patent Applications Nos. JP 2005-052026 filed on Feb. 25, 2005, JP 2005-088698 filed on Mar. 25, 2005, 2005-361061 filed on Dec. 14, 2005 and 2005-362465 filed on Dec. 15, 2005, the contents of which are incorporated herein by reference.

BACKGROUND OF THE INVENTION

1. Field of the Invention

The present invention relates to an image capturing apparatus, an image capturing method, an output apparatus, an output method and a program. Particularly, the present invention relates to an image capturing apparatus, an image capturing method, an output apparatus for outputting images, a method of outputting images and a program for the image capturing apparatus and the output apparatus.

2. Related Art

Conventionally, a digital still camera which can record not only static images but also moving images on a memory card, associate a sound detected by a microphone at capturing the static images and the moving with the images and record the same is known as described in Patent Application Publication No. 7-154734, for example. Additionally, an electronic photostand which can output the sounds recorded in association with images as displaying the static image and the moving image captured by the digital still camera is known.

However, since such camera only can record the sound at the image-capturing, the same sound is always reproduced in association with the image when the captured image is reproduced by an electronic photostand. Therefore, the user has got bored with the sound at reproducing the image. Additionally, most sound quality recorded by a microphone are inferior to musical data as digital data obtained from such as Internet and CD. Therefore, the user sometimes can not be satisfied with the reproduced music. Additionally, it is desirable that the user can appreciate the sound being not boring with the image without complicated works such as an editing the image and the sound. Further, it is desirable that the user can appreciate the environmental sound at image-capturing, such as a sound of the waves and a birdcall with higher sound quality in addition to music. Here, a technology for recording a composite image including a plurality images in association with the sounds has not been disclosed in the above-mentioned Patent Application Publication No. 7-154734.

SUMMARY OF THE INVENTION

Thus, an object of the present invention is to provide an image capturing apparatus, an image capturing method, an output apparatus, a output method and a program which can solve the above-described problem. This object is achieved by combining the features recited in independent claims. Then, dependent claims define further effective specific example of the present invention.

The output apparatus according to a first aspect of the present invention includes: an image storage section for storing a plurality of captured images; an image output section for outputting the images stored in the image storage section; an image output control section for controlling the image output section to output the images stored in the image storage section; a sound storage section for storing a plurality of recorded sound; a sound output section for output the sounds stored in the sound storage section; and a sound output control section, when the image output section outputs the image, for selecting a first sound among the plurality of sounds stored in the sound storage section and causing the sound output section to output the same, and when the image output section outputs the same image again, for selecting a second sound different from the first sound and causing the sound output section to output the same.

The sound storage section may store the plurality of sounds recoded by a recording function of a image capturing apparatus which captures the plurality of images stored in the image storage section. The sound storage section may store the plurality of sound recorded in a recording period equal to or longer than an image capturing period including a plurality of times at which each of the plurality of images stored in the image capturing section is captured. The total time of the plurality of sounds stored in the sound storage section may be longer than the time obtained by multiplying a preset output time at which the image output section outputs one image by the number of plurality of images stored in the image storage section.

The image storage section may store information indicative of the timings at which the plurality of images are captured in association with each of the plurality of images, respectively. The sound storage section may store information indicative of the timings at which the plurality of sounds are recorded in association with each of the plurality of sounds, respectively. The sound control section may sequentially select the sound in the order corresponding to the recorded timing close to the timing at which the image is captured.

The image storage section may store the times at which the plurality of images are captured in association with each of the plurality of images, respectively. The sound storage section may store the times at which the plurality of sound are recorded in association with each of the plurality of sounds, respectively. The sound control section may sequentially select the sound in the order corresponding to the recorded time close to the time at which the image is captured. The sound output control section may sequentially select the sound in the order corresponding to the volume.

The output apparatus further includes an output number of times holding section for counting the output number of times at which the plurality of sounds stored in the sound storage section are outputted by the sound output section and a target number of times storage section for storing the target umber of times at which the plurality of sounds stored in the sound storage section should be outputted by the sound output section. The sound output control section may sequentially select the sound in descending order of the value obtained by subtracting the output number of times from the target number of times.

The output apparatus may further includes an output ratio storage section for storing the output ratio being the ratio of the number of times at which the plurality of sounds stored in the sound storage section should be outputted by the sound output section. The sound output control section may select a sound in order that the ratio of the output number of times held by the output number of times holding section is close to the output ratio stored in the output ratio storage section.

The sound storage section may store each of the plurality of sounds recorded by the recording function in both of an image capturing mode in which the image capturing apparatus can accept an image-capturing operation and an non-image capturing mode in which the image capturing apparatus can not accept any image-capturing operation in association with the operation mode at recording the sound, respectively. The sound output control section may preferentially select the sound recorded in the image capturing mode of the image capturing apparatus than the sound recorded in the non-image capturing mode.

The output apparatus further includes a limited number of times storage section for storing the limited number of times of outputting the sound during outputting the sound by the sound output section. The sound output control section further may preferentially selects the sound which is stored in the limited number of times storage section lesser times.

The output apparatus further includes an output instruction reception section for receiving an instruction on outputting the plurality of images stored in the image storage section by the image output section and an output time detection section for detecting a time at which the output instruction reception section receives the instruction. The image storage section may store the times at which the plurality of images are captured in association with each of the plurality of images. The sound storage section may store the times at which the plurality of sounds are recorded in association with each of the plurality of sounds. The sound output control section may set the tolerance of the difference between the times at which the plurality of images stored in the image storage section are captured and the time at which the sound selected from the plurality of sounds stored in the sound storage section is selected based on the difference between the times detected by the output time detection section and the times at which the plurality of images are captured, which are stored in the image storage section.

The sound output control section may set the tolerance of the difference between the times at which the plurality of images stored in the image storage section are captured and the time at which the sound selected from the plurality of sounds stored in the sound storage section is recorded to be larger when the difference between the time detected by the output time detection section and the times at which the plurality of images stored in the image storage section are captured.

An output apparatus according to a second aspect of the present invention includes: an image storage section for storing images; a sound storage section for storing sounds in association with the images stored in the image storage section and the positions of the images; a partial region acquiring section for acquiring a partial region including at least a part of the image stored in the image storage section; an output image generating section for generating an output image from the image within the partial region acquired by the partial storage section; an output sound generating section for generating an output sound from the sounds stored in the sound storage section in association with the position in the total image at which the partial region acquired by the partial region acquiring section in the images stored in the image storage section is located; and an image output section for outputting the output image generated by the output image generating section and the output sound generated by the output sound generating section in association with each other in order to synchronously output them.

The output image generating section may combine the image within the partial region acquired by the partial region acquiring section in the image stored in the image storage section with the other images stored in the image storage section to generate an output image. The output sound generating section may generate an output sound by the sound stored in the sound storage section in association with the position in the total image at which the partial region acquired by the partial region acquiring section is located and the sound stored in the sound storage section in association with the other images included in the output image. The image output section may output the output image generated by the output image generating section and the output sound generated by the output sound generating section in association with each other in order to synchronously output them.

The output apparatus further includes a sound database for storing sounds in association with the kind of objects. The sound storage section may acquire the sound stored in the sound database in association with the kind of the object which is located at the position associated with the image stored in the image storage section.

The output sound generating section may generate an output sound obtained by enhancing the sound stored in the sound storage section in association with the position in the total image at which the object occupying larger dimension in the output image and the image including the object. The output sound generating section may generate an output sound obtained by combining with larger sound volume the sound stored in the sound storage section in association with the position in the total image at which the object occupying larger dimension in the output image and the image which includes the object.

The output sound generating section may generate an output sound obtained by enhancing the sound stored in the sound storage section in association with the position in the total image at which the object disposed more front in the output image and the image including the object. The output sound generating section may generate an output sound obtained by combining with larger sound volume the sound stored in the sound storage section in association with the position in the total image at which the object disposed more front in the output image and the image including the object.

The output apparatus according to a third aspect of the present invention includes: an image storage section for storing a plurality of images; a sound storage section for storing a plurality of sounds in association with each of the plurality of images stored in the image sing an output image by combining the plurality of images stored in the image storage section; an output sound generating section for generating an output sound in association with each of a first image and a second image included in the output image generated by the output image generating section using a first sound and a second sound stored in the sound storage section; and an image output section for outputting the output image generated by the output image generating section and the output sound generated by the output sound generating section in order to synchronously output them. The output sound generating section generates the output sound obtained by enhancing the first sound than the second sound and combining the first sound and the second sound when the first sound is enhanced than the second sound in the output image generated by the output image generating section.

The output sound generating section may generate the second sound and combining the first sound and the second sound when the first image is larger than the second image in the output image generated by the output image generating section. Additionally, the output sound generating section may generate the output sound obtained by enhancing the first sound than the second sound and combining the first sound and the second sound when the first image is positioned in front of the second image in the output image generated by the output image generating section.

The output sound generating section may generate the output sound obtained by enhancing the first sound than the second sound and combining the first sound and the second sound when the first image is positioned at more center than the second image in the output image generated by the output image generating section. Further, the output sound generating section may generate the output sound obtained by combining the first sound with the second sound having the volume smaller than that of the first sound when the first image is enhanced than the second image in the output image generated by the output image generating section.

An output apparatus according to a fourth aspect of the present invention includes: an image storage section for storing images captured by a image capturing apparatus; a sound storage section for storing sounds recorded by the image capturing apparatus; a characteristic sound extraction section for extracting a predetermined kind of sound from the sounds stored in the sound storage section; a sound acquiring section for acquiring a sound of which kind is same as that of the sound extracted by the characteristic sound extraction section from the sound database for storing a plurality of kinds of sounds therein; and an output section for synchronously outputting the sound acquired by the sound acquiring section and the image stored in the image storage section.

The image storage section may store the time at which the image is captured in association with the image. The sound in association with the sound. The characteristic sound extraction section may extract the predetermined kind of sound recorded within a preset allowed time since the image is captured.

The output apparatus may further include an output request acquiring section for acquiring a request for outputting the image stored in the image storage section, and an allowed time setting section for setting an allowed time to be longer when the difference between the time at which the output request acquiring section acquires the output request and the capturing time of the image stored in the image storage section is larger.

An output method according to a fifth aspect of the present invention includes the steps of: storing a plurality of images; storing a plurality of sounds in association with each of the plurality of images stored in the image storing step; generating an output image by combining the plurality of images stored in the image storing step; generating an output sound using a first sound and a second sound stored in the sound-storing step in association with each of a first image and a second image included in the output image generated in the output image generating step; outputting the output image generated in the output image generating step and the output sound generated in the output sound generating step in association with each other in order to synchronously output them. In the output sound generating step, the output sound is generated by enhancing the first sound than the second sound and combining them when the first image is enhanced than the second image in the output image generated in the output image generating step.

An output method according to a sixth aspect of the present invention includes the steps of: storing a plurality of captured images; outputting the images stored in the image storing step; controlling in the image outputting step to output the images stored in the image storing step; storing a plurality of recorded sounds; outputting the sound stored in the sound storing step; and controlling to select a first sound among the plurality of sounds stored in the sound storing step to output the same in the sound outputting step when the image is outputted in the image outputting step, and controlling to select a second sound different from the first sound among the plurality of sounds stored in the sound storage step to output the same in the sound outputting step when the same image is outputted again in the image outputting step.

An output method according to a seventh aspect of the present invention includes: storing an image; storing a sound in association with the image stored in the image storing step and the position in the image; acquiring a partial region including at least a part of image stored in the image storing step; generating an output image from the image within the partial region acquired in the partial region acquiring step in the image stored in the mage storing step; generating an output sound from the sound stored in the sound storing step in association with the position in the total image at which the partial region acquired in the partial region acquiring step is located in the image stored in the image storing step; and outputting the output image generated in the output image generating step and the output sound generated by the output sound generating step in association with each other in order to synchronously output the output them.

An output method according to an eighth aspect of the present invention includes: storing images captured by an image capturing apparatus; storing sounds recorded by the image capturing apparatus; extracting a predetermined kind of sound from the sounds stored in the sound storing step; acquiring a sound of which kind is same as that of the sound extracted in the characteristic sound extracting step from a sound database for storing plural pieces of music therein; and outputting synchronously the sound acquired in the sound acquiring step and the image stored in the image storing step.

A program for an output apparatus for outputting images according to a ninth aspect of the present invention operate the output apparatus to function as: an image storage section for storing a plurality of captured images; an image output section for outputting the images stored in the image storage section; an image output control section for controlling the image output section to output the images stored in the image storage section; a sound storage section for storing a plurality of recorded sound; a sound output section for output the sounds stored in the sound storage section; and a sound output control section, when the image output section outputs the image, for selecting a first sound among the plurality of sounds stored in the sound storage section and causing the sound output section to output the same, and when the image output section outputs the same image again, for selecting a second sound different from the first sound and causing the sound output section to output the same.

A program for an output apparatus for outputting images according to a tenth aspect of the present invention operate the output apparatus to function as: an image storage section for storing images; a sound storage section for storing sounds in association with the images stored in the image storage section and the positions of the images; a partial region acquiring section for acquiring a partial region including at least a part of the image stored in the image storage section; an output image generating section for generating an output image from the image within the partial region acquired by the partial region acquiring section in the images stored in the image storage section; an output sound generating section for generating an output sound from the sounds stored in the sound storage section in association with the position in the total image at which the partial region acquired by the partial region acquiring section in the images stored in the image storage section is located; and an image output section for outputting the output image generated by the output image generating section and the output sound generated by the output sound generating section in association with each other in order to synchronously output them.

A program for an output apparatus for outputting images according to an eleventh aspect of the present invention operate the output apparatus to function as: an image storage section for storing a plurality of images; a sound storage section for storing a plurality of sounds in association with each of the plurality of images stored in the image sing an output image by combining the plurality of images stored in the image storage section; an output sound generating section for generating an output sound in association with each of a first image and a second image included in the output image generated by the output image generating section using a first sound and a second sound stored in the sound storage section; and an image output section for outputting the output image generated by the output image generating section and the output sound generated by the output sound generating section in order to synchronously output them. The output sound generating section generates the output sound obtained by enhancing the first sound than the second sound and combining the first sound and the second sound when the first sound is enhanced than the second sound in the output image generated by the output image generating section.

A program for an output apparatus for outputting images according to a twelfth eleventh aspect of the present invention operate the output apparatus to function as: an image capturing apparatus for capturing images; a recording section for recording sounds surrounding the image capturing apparatus; a characteristic sound extraction section for extracting a predetermined kind of sound from the sounds recorded by the recording section; a sound acquiring section for acquiring a sound of which kind is same as that of the sound extracted by the characteristic sound extraction section from a sound database for storing a plurality of kinds of sounds therein; and a data storage section for storing the sound acquired by the sound acquiring section and the image stored in the image storage section each other in order to synchronously output them.

An image capturing apparatus according to a thirteenth aspect of the present invention includes: an image capturing section; an object extraction section for extracting an object included in an image captured by the image capturing section; a sound acquiring section for acquiring a sound associated with the object extracted by the object extraction section; an object position identification section for identifying the position of the object associated with the sound acquired by the sound acquiring section in the image captured by the image capturing section; and a sound storage section for storing the sound acquired by the sound acquiring section in association with the position of the object identified by the object identification section.

The image capturing apparatus further includes a recording section for recording sounds surrounding the image capturing apparatus. The sound acquiring section may extract the sound associated with the object extracted by the object extraction section from the sounds recorded by the recording section. The object position identification section may identify the position of the object associated with the sound extracted by the sound acquiring section in the image captured by the image capturing section. The sound storage section may store the sound extracted by the sound acquiring section in association with the position of the object identified by the object position identification section.

An image capturing apparatus according to a fourteenth aspect of the present invention includes: an image capturing section; a recording section for recording sounds surrounding the image capturing section; a characteristic sound extraction section for extracting a predetermined kind of sound from the sounds recorded by the recording section; a sound acquiring section for acquiring a sound of which kind is same as that of the sound extracted by the characteristic sound extraction section from a sound database for storing a plurality kinds of sounds therein; and a data storage section for storing the sound acquired by the sound acquiring section and the image stored in the image storage section each other in order to synchronously output them.

The characteristic sound extraction section may extract the predetermined kind of sound from the sounds recorded by the recording section within a preset period since the image capturing section captures the image.

The image capturing apparatus according to the may further include a display section for displaying an image of light received by light receiving elements included in the image capturing section, and a mode setting section for setting an image capturing mode in which the display section displays an image or a non-image capturing mode in which the display section does not display any image. The recording section may record the sounds surrounding the image capturing section both of when the mode setting section sets the image capturing mode and when the mode setting section sets the non-image capturing mode.

The characteristic sound extraction section may extract the predetermined kind of sound from the sounds recorded by the recording sound within the preset period equal to or longer than the time for the image capturing mode set by the mode setting section. The sound database may store plural pieces of music. The characteristic sound extraction section may extract the music from the sound recorded by the recording section. The sound acquiring section may acquire a music identical to the music extracted by the characteristic sound extraction section form the sound database.

The image capturing apparatus may further include a condition storage section for previously storing the condition to identify each of the kind of environmental sounds extracted by the characteristic sound extraction section. The sound database stores a plurality of environmental sounds for each kind thereof. The characteristic sound extraction section may extract the environmental sound corresponding to the condition stored in the condition storage section. The sound acquiring section may acquire a sound of which kind is same as that of the environmental sound extracted by the characteristic sound extraction section. The data storage section may store the environmental sound acquired by the sound acquiring section and the image captured by the image capturing section in association with each other in order to synchronously output them.

The sound database may store the plural pieces of music for each age. The characteristic sound extraction section may acquire the music from the sound recorded by the recording section. The sound database may store the plural pieces of music for each genre. The sound acquiring section may acquire the music of which age is same that of the music extracted by the characteristic sound extraction section. The sound database may store plural pieces of music depending on the genre. The image acquiring section may acquire the music in the genre same as the music extracted by the characteristic sound extraction section.

An image capturing method according to a fifteenth aspect of the present invention includes the steps of: capturing images; extracting an object included in the image captured in the image capturing step; acquiring the sound associated with the object extracted in the object extracting step; identifying the position of the object associated with the sound acquired in the sound acquiring step in the image captured in the image capturing step; and storing the sound acquired in the sound acquiring step in association with the position of the object identified in the object position identifying step.

An image capturing method according to a sixteenth aspect of the present on invention includes: capturing images by an image capturing section; recording sounds surrounding the image capturing section; extracting a predetermined kind of sound from the sounds recorded in the recording step; acquiring a sound of which kind is same as that of the sound extracted in the characteristic sound extracting step from a sound database for storing a plurality of kinds of sounds therein; and storing the sound acquired in the sound acquiring step and the image captured by the image capturing section in association with each other in order to synchronously output them.

A program for an image capturing apparatus for capturing images according to a seventeenth aspect of the present invention operates the image capturing apparatus to function as: an image capturing section; an object extraction section for extracting an object included in an image captured by the image capturing section; a sound acquiring section for acquiring a sound associated with the object extracted by the object extraction section; an object position identification section for identifying the position of the object associated with the sound acquired by the sound acquiring section in the image captured by the image capturing section; and a sound storage section for storing the sound acquired by the sound acquiring section in association with the position of the object identified by the object identification section.

A program for an image capturing apparatus for capturing images according to a eighteenth aspect of the present invention-operates the image capturing apparatus to function as: an image capturing section; a recording section for recording sounds surrounding the image capturing section; a characteristic sound extraction section for extracting a predetermined kind of sound from the sounds recorded by the recording section; a sound acquiring section for acquiring a sound of which kind is same as that of the sound extracted by the characteristic sound extraction section from a sound database for storing a plurality kinds of sounds therein; and a data storage section for storing the sound acquired by the sound acquiring section and the image stored in the image storage section each other in order to synchronously output them.

Here, all necessary features of the present invention are not listed in the summary of the invention. The sub-combinations of the features may become the invention.

According to the present invention, an output apparatus for output the sound associated with the captured image which does not cause the user to get bored can be provided. Additionally, an image capturing apparatus and an output apparatus which allows the user to easily obtain the sound at capturing the image along with the image are provided.

BRIEF DESCRIPTION OF THE DRAWINGS

FIG. 3 shows a table indicative of an example of data stored in a sound storage section 220 according to an embodiment of the present invention;

FIG. 5 shows a table indicative of another example of data stored in the sound storage section 220 according to an embodiment of the present invention;

FIG. 6 shows a table indicative of an example of data stored in a target number of times storage section 232 according to an embodiment of the present invention;

FIG. 7 shows a table indicative of an example of data stored in an output ratio storage section 234 according to an embodiment of the present invention;

FIG. 13 shows an example of data stored in a sound storage section 960 or a sound storage section 1060 according to an embodiment of the present invention;

FIG. 14 shows an example of the output image generated by an output image generating section 1075 according to an embodiment of the present invention;

FIG. 17 shows a table indicative of an example of data stored in an explanation sound database 170 according to another embodiment of the present invention;

FIG. 18 shows an example of the distribution of the positions at which images are captured according to another embodiment of the present invention;

FIG. 19 shows an example of the distribution of the times at which images are captured according to another embodiment of the present invention;

FIG. 21 shows a table indicative of an example of data stored in a music database 172 according to another embodiment of the present invention;

DETAILED DESCRIPTION OF THE INVENTION

Figure 1:
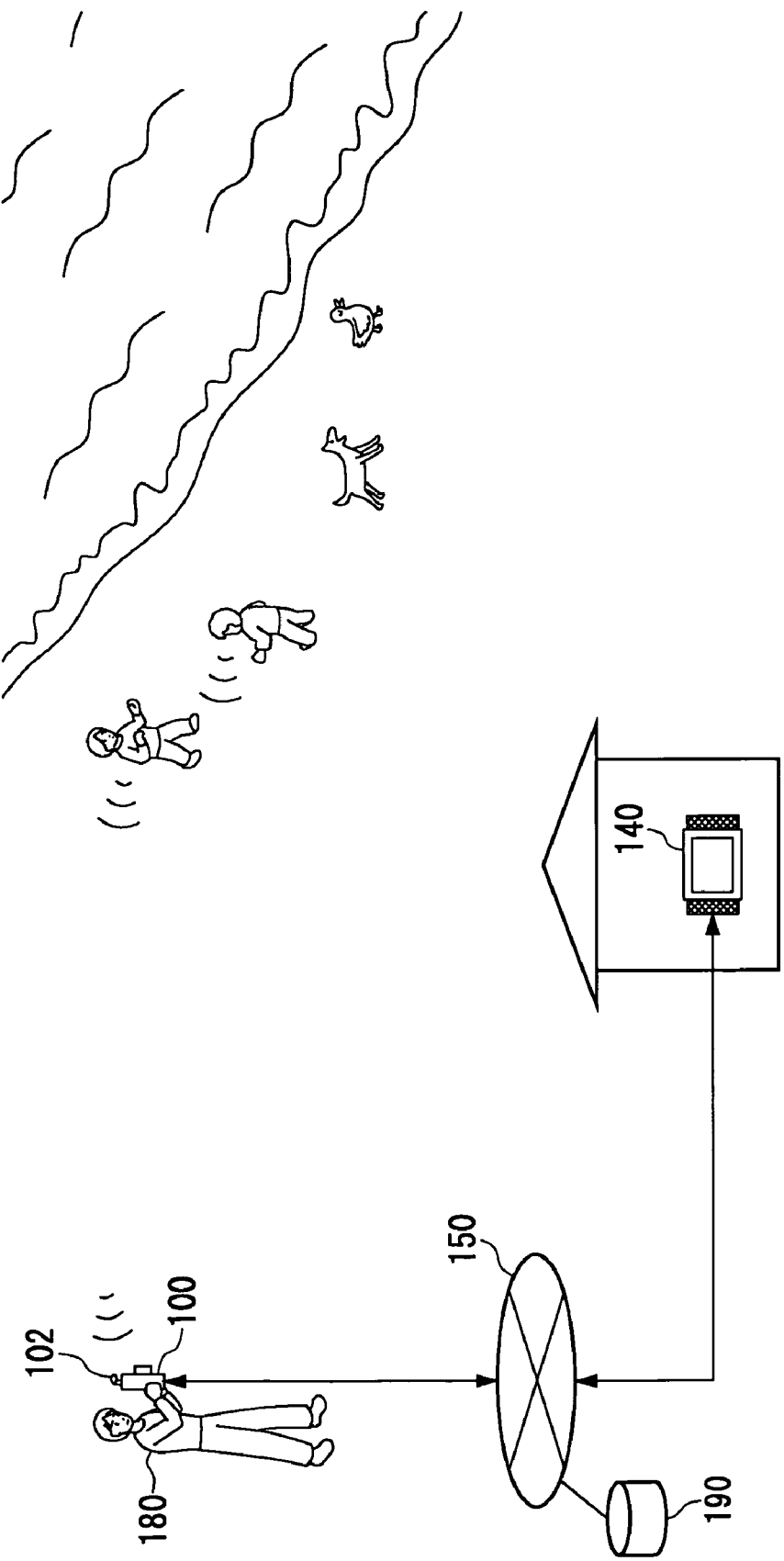
FIG. 1 shows an example of a sound output system according to an embodiment of the present invention.

Hereinafter, the present invention will now be described through preferred embodiments. The embodiments do not limit the invention according to claims and all combinations of the features described in the embodiments are not necessarily essential to means for solving the problems of the invention.

Before describing the present invention in detail, for the sake of clarity and understanding, it is noted that the same components having the same functions in each of the accompanying drawings are designated by the same reference numerals throughout each of the several Figures illustrated herein.

FIG. 1 shows an example of a sound output system according to a first embodiment of the present invention. The sound output system includes an image capturing apparatus 100, an output apparatus 140 and a sound database 190. In this example, the image capturing apparatus 100 captures the images of persons who play on the beach. The image capturing apparatus 100 records the sound surrounding the image capturing apparatus 100 by a microphone 102. Additionally, the image capturing apparatus 100 transmits the image and sound captured and recorded by the image capturing apparatus 100 to the output apparatus 140 through a communication line 150 such as Internet. The output apparatus 140 synchronously outputs the image and sound received from the image capturing apparatus 100. At this time, the output apparatus 140 outputs the sound different from the sound previously outputted when the same image is outputted again. Therefore, a user 180 can appreciate the music for each time at which the image is outputted so that the user 180 can appreciate images without getting bored.

The output apparatus 140 may be an apparatus for outputting images and sounds such as a HDTV, an electronic photostand and computer. Additionally, the output apparatus 140 may output sounds as characters. For example, the output apparatus 140 displays the sounds as the characters on the display device such as a LCD while the image is displayed on the display device. Here, the output apparatus 140 may display the characters on the display device for displaying images or the other display. Additionally, the output apparatus 140 may be a printing device for printing images, such as a printer and print sounds as characters during printing images.

The image capturing apparatus 100 may be such as a digital still camera and a camera cell-phone. Additionally the image capturing apparatus 100 may have a function for outputting images or sounds as well as the output apparatus 140. The image capturing apparatus 100 may record image and sound data on a recording medium and the output apparatus 140 may receive the data from the recording medium to output the image and sound. Further, the image capturing apparatus 100 may store the directories associated with the directories provided for each user 180 in a server connected to the communication line 150, such as the directories associated with the image capturing apparatus 100. Then, the output apparatus 140 may receive the image and sound data stored in the server for each user 180.

The image capturing apparatus 100 extracts objects such as a dog and a bird shown on the captured image and identifies the kind of the extracted object. Then, the image capturing apparatus 100 acquires the sound representative sound of the identified kind of object from a sound database 190 for storing the representative sound of the object for each kind such as a dog and a bird. Then the image capturing apparatus 100 provides the acquired sound in association with the captured image to the output apparatus 140. The output apparatus 140 receives an instruction on editing the image by the user 180. For example, the output apparatus 140 combines a plurality of images designated by the user 180 in the layout designated by the user 180 to generate an output image. At this time, the output apparatus 140 generates an output sound obtained by combining the sounds associated with each of the images used for generating the output image by the ratio of the sound volume same as the dimension ratio of each image in the output image. Then, the output apparatus 140 reproduces the generated output image in synchronism with displaying the output image. Therefore, the output apparatus 140 can provide an output image obtained by combining the image shown on a dog and the image shown on a bird along with the output sound in which the dog's bark and the birdcall is combined to the user 180. Thereby the user 180 can easily appreciate a desirable sound depending on the content of the edited output image using the output apparatus 140.

Figure 2:
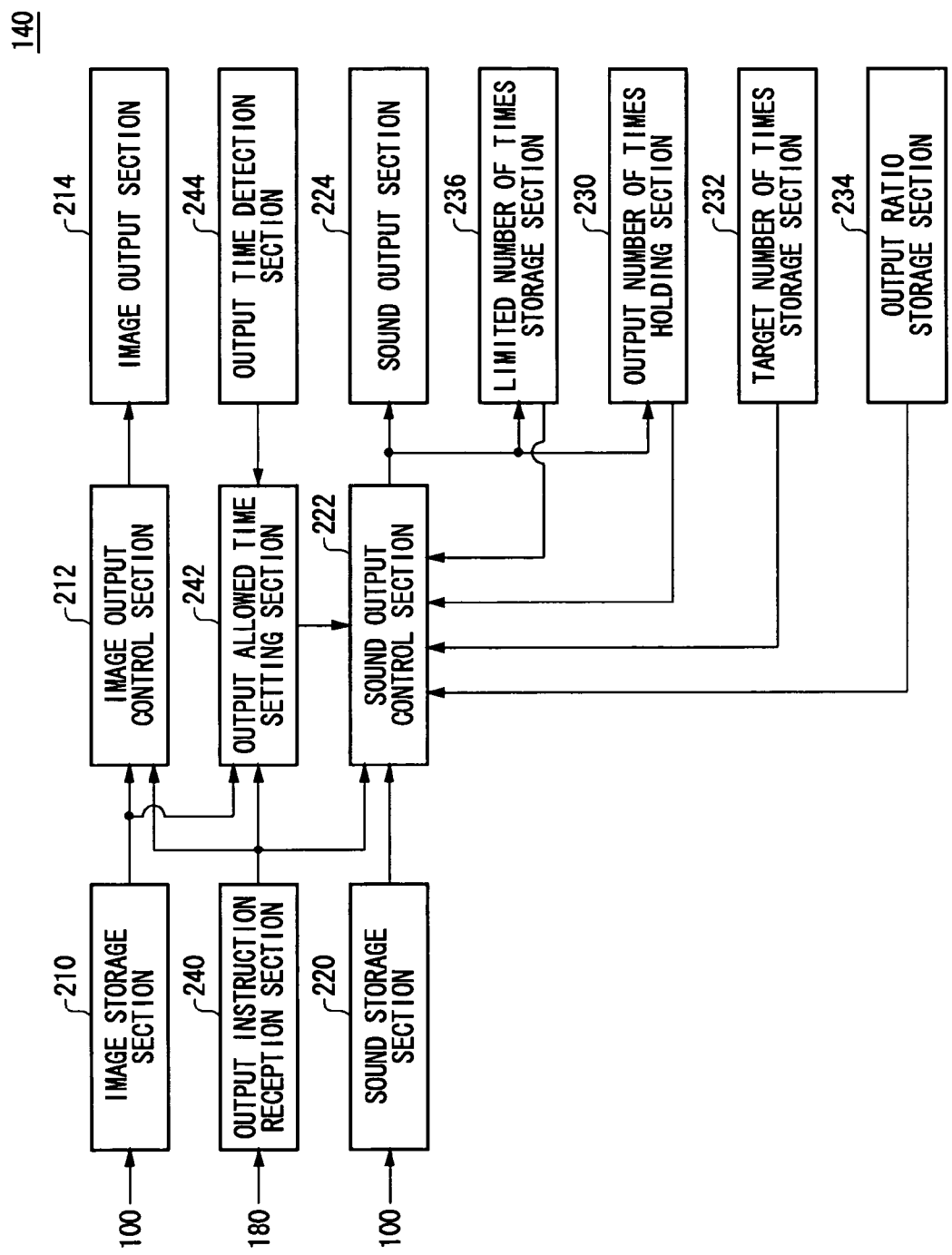
FIG. 2 shows an example of a block configuration of an output apparatus 140 according to an embodiment of the present invention.

FIG. 2 shows an example of a block configuration of the output apparatus 140 according to the embodiment. FIG. 2 shows an example of a block configuration of the output apparatus 140 for controlling not to output the same sound again for the same image. The output apparatus 140 includes an image storage section 210, an image output control section 212, an image output section 214, an output instruction reception section 240, an output allowed time setting section 242, an output time detection section 244, a sound storage section 220, a sound output control section 222, a sound output section 224, an output number of times holding section 230, a target number of times storage section 232, an output ratio storage section 234 and a limited number of times storage section 236.

The image storage section 210 stores a plurality of captured images. The image storage section 210 stores information indicative of the timings at which the plurality of images are captured in association with each of the plurality of images, respectively. Specifically, the image storage section 210 stores the times at which the plurality of images are captured in association with each of the plurality of images, respectively.

The output instruction reception section 240 receives an instruction on outputting the plurality of images stored in the image storage section 210. The image output control section 212 controls the image output section 214 to output the images stored in the image storage section 210 based on the instruction by the output instruction reception section 240. The image output section 214 may be a display device for outputting images such as a LCD, or a printing device for printing images.

The sound storage section 220 stores a plurality of recorded sounds. For example, the sound storage section 220 stores the plurality of sounds recorded by a recording function of the image capturing apparatus 100 which captured the plurality of images stored in the image storage section 210. Specifically, the sound storage section 220 stores the sound recorded by the recording function of the image capturing apparatus 100 when the plurality of images stored in the image storage section 210 are captured and also stores the sound recorded by the recording function of the image capturing apparatus 100 when the plurality of images stored in the image storage section 210 are not captured.

The sound storage section 220 stores information indicative of the timings at which the plurality of sounds are recorded in association with each of the plurality of sounds, respectively. Specifically, the sound storage section 220 stores the times at which the plurality of sounds are recorded in association with each of the sounds, respectively. Here, the time at which the sound is recorded may be a time at which the recording is started or a time at which the recording is terminated. Additionally, the sound storage section 220 may store information indicative of the times at which the plurality of images are started to record and the order of recording the plurality of sounds.

The sound storage section 220 stores a plurality of sound recorded within a recording period equal to or longer than an image capturing period including a plurality of times at which the plurality of images stored in the image storage section 210 is captured. Here, the total time of the plurality of sound stored in the sound storage section 220 is longer than the time obtained by multiplying a preset output time at which the image output section outputs one image by the number of the plurality of images stored in the image storage section.

The sound output section 224 outputs the sound stored in the sound storage section 220. Specifically, the sound output section 224 may be a reproducing device for reproducing sounds. Additionally, the sound output section 224 may include a display device for outputting characters, such as a LCD and output the sound stored in the sound storage section 220 as characters on the display device. Further, the sound output section 224 may include a printing device for printing characters such as a printer.

The sound output control section 222 selects a first sound among the plurality of sounds stored in the sound storage section 220 and causes the sound output section 224 to output the same when the image output section 214 output images, alternatively, selects a second sound different from the first sound among the plurality of sounds stored in the sound storage section 220 and causes the sound output section 224 to output the same when the image output section 214 outputs the same image again. Therefore, the user 180 can appreciate different sounds for each outputted image.

Here, the sound output control section 222 selects the sound in the order corresponding to the recording timing close to the timing at which the image is captured. For example, the sound output control section 222 selects the sound in the order corresponding to the recording time close to the time at which the image is captured. Additionally, the sound output control section 222 may select the sound in descending order of the volume. Therefore, the user 180 can preferentially appreciate the characteristic sound at the time at which the image was captured.

The output number of times holding section 230 counts the output number of times at which the plurality of sounds stored in the sound storage section 220 are outputted by the sound output section 224. The target number of times storage section 232 stores the target number of times at which the plurality of sounds stored in the sound storage section 220 should be outputted by the sound output section 224. Then, the sound output control section 222 may select the sound in descending order of the value obtained by subtracting the output number of times from the target number of times.

The output ratio storage section 234 stores the output ratio being the ratio of the number of times at which the plurality of sounds stored in the sound storage section 220 should be outputted by the sound output section 224. Then, the sound output control section 222 may select the sound in order that the ratio of the output number of times held by the output number of times holding section 230 is close to the output ratio stored in the output ratio storage section 234. Therefore, the user 180 can more appreciate the characteristic sound at the time at which the image was captured.

Here, the sound storage section 220 stores the plurality of sounds recorded by the recording function in both of an image capturing modes in which the image capturing apparatus can accept an image capturing operation and an non-image capturing mode in which the image capturing apparatus 100 can not accept any image capturing operation in association with the operation mode when the sound is recorded. Then, the sound control section 222 preferentially selects the sound recorded in the image capturing mode than the sound recorded in the non-image capturing mode.

If the sound is limited to be outputted when the sound stored in the sound storage section 220 is outputted from the sound output section 224, the limited number of times storage section 236 counts the limited number of times and stores the same. Then the sound output control section 222 preferentially selects the sound which is stored in the limited number of times storage section lesser times. Here, sound output control section 222 may calculate the limited ratio for limiting to output the sound based on the output number of times held by the output number of times holding section 230 and the number of times stored in the limited number of times storage section and preferentially select the sound of which calculated limited ratio is smaller.

The output time detection section 244 may detect the time at which the output instruction reception section 240 receives the instruction. Then, the output allowed time setting section 242 sets the tolerance of the difference between the times at which the plurality of images stored in the image storage section 210 are captured and the time at which the sound selected from the plurality of sounds stored in the sound storage section 220 is recorded based on the difference between the time detected by the output time detection section 244 and the times at which the plurality of images stored in the image storage section 210 are captured. Then, the sound output control section 222 selects the sound to be outputted by the sound output section 224 among the sounds recorded within the tolerance set by the output allowed time setting section 242.

Specifically, the output allowed time setting section 242 sets the tolerance of the difference between the times at which the plurality of images stored in the image storage section 210 are captured and the time at which the sound selected from the plurality of sound stored in the sound storage section 220 is recorded to be larger when the difference between the time detected by the output time detection section 244 and the times at which the plurality of images stored in the image storage section 210 are captured is larger. Therefore, the output apparatus 140 outputs the image captured at near past along with the sound selected among the sound recorded at the time close to the image capturing time, so that the sound outputted along with the image can be more natural for the user 180. Additionally, the output apparatus 140 can output the sound selected from the sounds recorded within wider time range when the image captured at the distant past is outputted, so that the user 180 can appreciate more characteristic sound.

The above-described output apparatus 140 can select the sound to be outputted among the plurality of sounds even if the same image is outputted again. Therefore, the user can appreciate both of the sound and the image without getting bored. Additionally, the user 180 can appreciate more characteristic sound at capturing the image to be outputted by the output apparatus 140 along with the image.

FIG. 3 shows a table indicative of an example of data stored in the sound storage section 220 according to an embodiment of the present invention. The sound storage section 220 stores sound IDs for identifying a plurality of sound data and times at which the sounds are recorded in association with a plurality of sound data. Here, the times at which the sound are recorded may be the time at which a recording is started and the time at which the recording is terminated. Additionally, the time at which the sound is recorded may include the date at which the sound is recorded.

Figure 4:
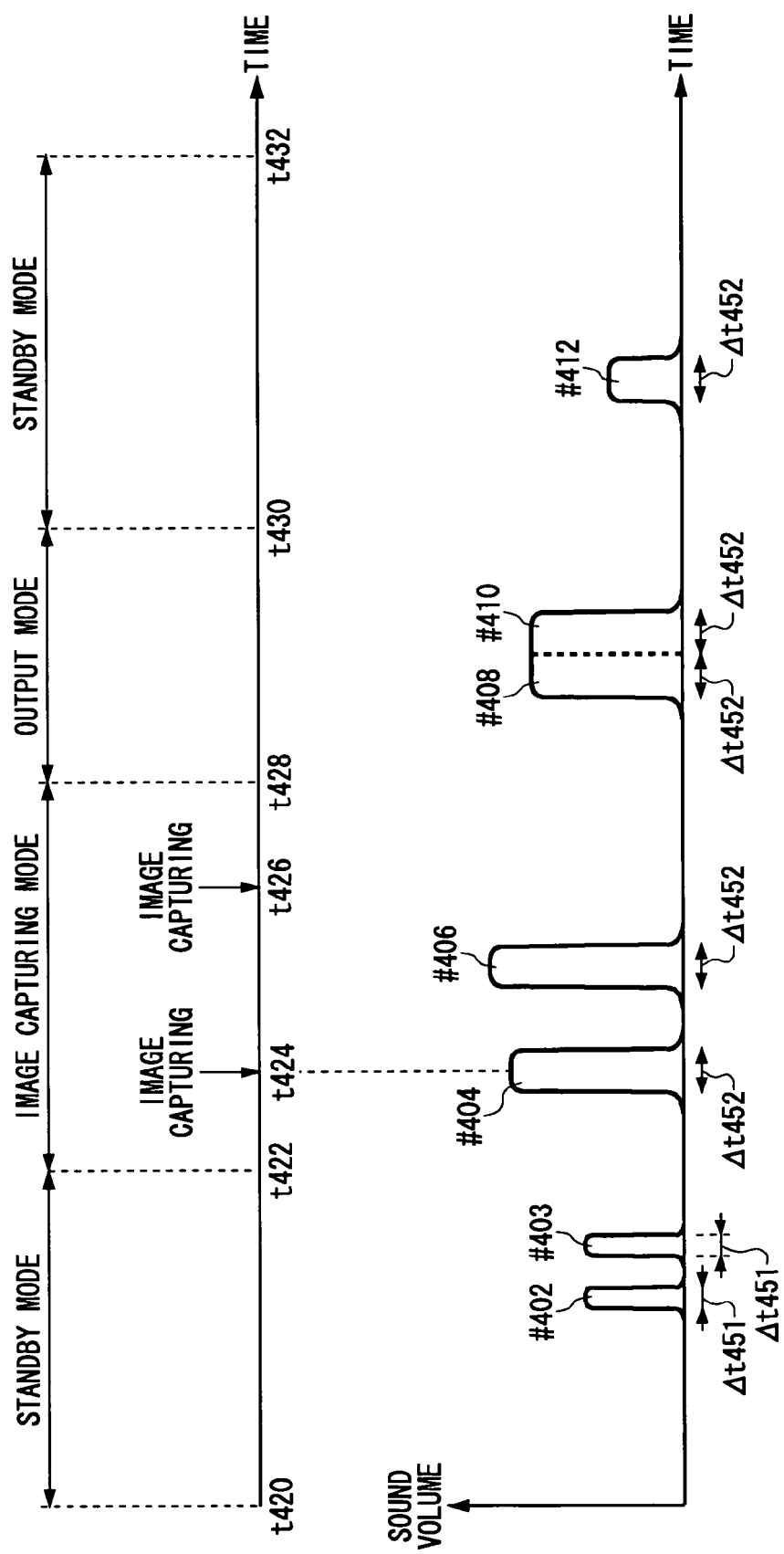
FIG. 4 shows an example of the time relationship between an image-capturing and a sound-recording according to an embodiment of the present invention.

FIG. 4 shows an example of the time relationship between a sound-recording and an image-capturing. The image capturing apparatus 100 has operation modes including a standby mode, an image capturing mode and an output mode. Then, the output apparatus 140 stores the sound which are recorded within a period for which the image capturing apparatus 100 is in any of the standby mode, the image capturing mode or the output mode. Here, the image capturing mode may be an operation mode in which the image capturing apparatus 100 can capture an image and/or record a sound. For example, the image capturing mode may be an operation mode in which the image capturing apparatus 100 can capture an image by pushing a release button by the user 180. The output mode may be an operation mode in which the image capturing apparatus 100 can output an image and/or a sound. For example, the output mode may be an operation mode in which the image capturing apparatus 100 can read the image stored in such a memory and display the same on the display device such a monitor screen.

Here, the image capturing apparatus 100 is set the standby mode immediately after activating. The image capturing apparatus 100 is shifted to the image capturing mode when any operation regarding an image-capturing or a recording is executed by the user 180 provided that the operation mode is set the standby mode or the output mode. Where, the operation regarding the image-capturing includes an image capturing and an adjusting of any image-capturing condition such as a shutter speed and a focal length. Additionally, the operation regarding the recording includes a recording of a sound and an adjusting of any recording condition such as a recording sensitivity. The image capturing apparatus 100 is shifted to the output mode when any operation regarding an outputting of the image capturing apparatus 100 is executed by the user 180 provided that the operation mode is set to the standby mode or the image capturing mode. The operation regarding the outputting includes an outputting of an image, a selecting of the image to be outputted and an adjusting of an output condition such as an output speed. Here, the image capturing apparatus 100 may be shifted to the standby mode when the image capturing apparatus 100 is set to the image capturing mode or the output mode provided that any operation is not executed by the user 180 for a predetermined period. Thus, the image capturing apparatus 100 is shifted to the image capturing mode without capturing any image when the release button is pushed by the user 180 provided that the operation mode is set to the standby mode or the output mode except for the image capturing mode. Additionally, the standby mode and the output mode may be an operation mode in which the image capturing apparatus 100 does not allow the release button to be pushed by the user 180.

The sound storage section 220 stores sounds #404 and #406 which are recorded by the image capturing apparatus 100 during a period for which the image capturing apparatus 100 is set to the image capturing mode (t422-t428). Additionally, the sound storage section 220 stores sounds #408 and #410 which are recorded by the image capturing apparatus 100 during a period for which the image capturing apparatus 100 is set to the output mode (t428-t430). Further, the sound storage section 220 also stores sounds #402, #403 and #412 which are recorded by the image capturing apparatus 100 during a period for which the image capturing apparatus 100 is set to the standby mode (t420-t422 and t430-t432).

Additionally, the sound storage section 220 stores a sound having the length obtained by multiplying a predetermined output time ($\Delta t452$) at which the image output section 214 outputs one image by the number of images stored in the image storage section 210. For example, the sound storage section 220 stores two or more sounds (#404, #406, #408, #410 and #412) having the length for the output time $\Delta t452$, and the sounds #402 and #403 having the length for the output time $\Delta t451$ which is half as long as $\Delta t452$ as the output sound for two images captured at a time t424 and a time t426 when the output time per image is $\Delta t452$. Therefore, the sound output control section 222 can select a different sound among the plurality of sounds and output the same for each time at which the image output section 214 outputs the image.

Additionally, the sound output control section 222 may select the plurality of images and cause the sound output section 224 to output the same in order that the total time of the selected sounds is to be a preset time at which the image output section 214 outputs one image when the sound output control section 222 selects the sound to be outputted by the sound output section 224. For example, the sound output control section 222 may select the sounds #402 and #403 having the length being half as long as the output time $\Delta t452$ and cause the sound output section 224 to output the same when the image captured at the time t424 is outputted. Additionally, the sound output control section 222 may select the sound #408 or #410 having the divided length $\Delta t452$, respectively and cause the sound output section 224 to output the same when the sound storage section 220 stores the sound having the length longer than the output time $\Delta t452$.

The image output control section 212 may adjust the output time at which the image output section 214 outputs an image based on the number of images outputted from the image output section 214 and the total time for the plurality of sounds to be outputted. For example, the image output control section 212 causes the image output section 214 to output each image for periods obtained by the total time of the plurality of sounds to be outputted by the number of images to be outputted when the output instruction reception section 240 receives the plurality of sounds and images to be outputted from the user 180.

Here, when the sound output control section 222 receives the instruction on outputting images captured at the time t424 from the output instruction reception section 240, the sound output control section 222 outputs the sounds in the order corresponding to close to the time at which each image is captured for each time at which the image is outputted. For example, when the sound output control section 222 outputs the image captured at the time t424, the sound output control section 222 sequentially selects the sounds in the order of #404, #406, #402, #403, #408, #410 and "412 and causes the sound output section 224 to output the same. Additionally, the sound output control section 222 sequentially selects the sound in descending order of the volume such as #406, #404, #408, #410, #403 #402 and #412 and causes the sound output section 224 to output the same. Here, the sound output control section 222 may select the sound having the volume larger than a predetermined threshold sound volume. At this time, the sound output control section 222 may set the threshold sound volume in order that the total length of the selected sounds is longer than a predetermined output time.

The image capturing apparatus 100 may record the sound having the preset volume among sounds surrounding the image capturing apparatus 100. For example, the image capturing apparatus 100 may record the sound having the volume larger than the preset threshold sound volume. Additionally, the image capturing apparatus 100 may record the sound having the volume larger than the preset volume changed by changing the recording sensitivity. Then, the image capturing apparatus 100 may store the sound recorded in association with the preset sound volume. Then, the image storage section 210 acquires the sound recorded by the image capturing apparatus 100 in association with the preset sound volume and stores the same. Then, the sound output control section 222 calculates the ratio of the sound volume to the preset sound volume associated with the sound and may select the sound in descending order of the ratio. Thereby the sound output control section 222 can select the sound in descending order of the ratio of the sound volume to the preset sound volume. Additionally, the sound output control section 222 may select the sound in descending order of the ratio of the sound volume to the preset sound volume being the difference between the recorded sound volume and the preset sound volume at the recording time. Therefore, the sound recorded with a low threshold sound volume is easily reproduced by the output apparatus 140 even if the magnitude of the sound volume is small. For example, in the case that the user 180 records the sound of small insects with the low threshold sound volume while the user 180 captures the image of the insects, the sound of small insects is easily reproduced by the output apparatus 140. Thus, the output apparatus 140 can preferentially reproduce the sound reflecting the user 180's intention at image-capturing.

FIG. 5 shows a table indicative of another example of data stored in a sound storage section 220. The sound storage section 220 stores sound IDs for identifying sound data, times at which sounds are recorded and indexes in association with sound data. Here, the times stored in the sound storage section 220 may be a time at which a recording is started. The indexes stored in the sound storage section 220 may be a value indicative of the timing at which a sound is recorded. For example, the sound storage section 220 stores the value indicative of the order that each sound is recorded from the time at which the recording is started as indexes. The sound output control section 222 determines the timing at which the sound is recorded from the time and the index stored in the sound storage section 220. The sound output control section 222 may sequentially select the sound in the order corresponding to the timing at which the sound is recorded is close to the timing at which the image to be outputted by the image output section 214 is captured.

The sound storage section 220 may store sound data in association with the sound volume of the sound data. Here, the sound volume may be the average sound volume being an average of sound volume per hour of the sound data, and may be the maximum sound volume or the minimum sound volume of the sound data. Additionally, the sound volume may be the intermediate sound volume being the average of the maximum sound volume and the minimum sound volume. Therefore, the sound output control section 222 can rapidly select the sound when the sound is sequentially selected in descending order of the volume.

Additionally, the sound storage section 220 may store sound data in association with the time change of the sound volume. The time change of the sound volume may be the time change in itself or information indicative of the change of the magnitude of the sound volume (for example, an increasing speed and a decreasing speed). Then, the sound output control section 222 may select the sound from the sound storage section according to the size or the change of size of the image displayed on the image output section 214 and cause the sound output section 224 to output the same. For example, the sound output control section 222 may select the sound having the volume which is increasing from the sound storage section 220 and cause the sound output section 224 to output the same when the image output section 214 displays an image as enlarging the same. Alternatively, the sound output control section 222 may select the sound having the volume which is decreasing from the sound storage section 220 and cause the sound output section 224 to output the same when the image output section displays an image as reducing the same.

provided that the operation mode is set the standby mode of the output mode.

Additionally, the sound storage section 220 may store the data of the sound stereophonically recorded in association with the time change of each of the right sound and the left sound. Here, the time change of the right sound and the left sound may be the time change of the right sound and the left sound themselves, or information indicative of the change of the magnitude of the sound volume (an increasing speed or a decreasing speed). Then, the sound output control section 222 may select the sound from the sound storage section 220 and cause the sound output section 224 to output the same according to the position of the image or the change of the position displayed on the image output section 214. For example, the sound output control section 222 may select the sound of which right side volume is large and left side volume is small and output the same when the image output section 214 displays the image as sliding the same from right to left. Therefore, the output apparatus 140 can reproduce a desirable image according to the position and the size of the image to be displayed.

FIG. 6 shows a table indicative of an example of data stored in a target number of times storage section 232. The target number of times storage section 232 stores the target number of times being the number of times at which the sounds identified by the sound IDs should be outputted by the sound output section 224 in association with the sound IDs stored in the sound storage section 220. Here, the output number of times holding section 230 stores the output number of times at which the sounds are outputted by the sound output section 224 in association with the sound IDs stored in the sound storage section 220. Then, the sound output control section 222 calculates the value obtained by subtracting the output number of times held by the output number of times holding section 230 from the target number of times and selects the sound in descending order of the value to cause the sound output section 224 to output the same. Therefore, the target number of times of more characteristic sound when the image is captured by the image capturing apparatus 100 is set more times, so that the characteristic sound at the image-capturing can be outputted more times when the image is outputted. Additionally, since sounds other than the characteristic sound are outputted sometimes after outputting the characteristic sound at image-capturing many times, the user can appreciate the image without getting bored.

The target number of times storage section 232 may store a target number of times set by the user 180. Additionally, the target number of times storage section 232 may set a target number of times based on the volume of the sound stored in the sound storage section 220. For example, the target number of times storage section 232 may set the target number of times of the sound having larger volume more times. Additionally, the target number of times storage section 232 may set the number of times at which the sound including a human voice should be outputted more times than that at which the sound not including any human voice should be outputted.

Additionally, the target number of times storage section 232 may store the target number of times at which the plurality of images should be outputted for each image stored in the image storage section 210. Specifically, the target number of times storage section 232 stores image IDs stored in the image storage section 210, sound IDs and target number of times. Then, the sound output control section 222 selects the sound in descending order of the value obtained by subtracting the output number of times from the target number of times among the plurality of sounds stored in association with the image ID for identifying the image and causes the sound output section 224 to output the same when the image output section 214 output the image.

FIG. 7 shows a table indicative of an example of data stored in an output ratio storage section 234. The output ratio storage section 234 stores the output ratio being a ratio of the number of times at which the sound identified by the sound ID should be outputted by the sound output section 224 in association with the sound IDs stored in the sound storage section 220. Then, the sound output control section 222 calculates the ratio of the number of times at which each sound is outputted based on the output number of times held by the output number of times holding section 230 and selects the sound in order that the ratio of the output number of times is close to the output ratio stored in the output ratio storage section 234. Thereby when the output ratio of the characteristic sound when the image is captured by the image capturing apparatus 100 is larger, the characteristic sound at the image-capturing can be outputted more times. Therefore, the user 180 can appreciate the characteristic sound at image-capturing many times along with various sounds while the user 180 views the image.

The output ratio storage section 234 may store an output ratio set by the user 180. Additionally, the output ratio storage section 234 may set an output ratio based on the volume of the sound stored in the sound storage section 220. For example, the output ratio storage section 234 may set the output ratio at which the sound having larger volume is outputted to be larger. Further, the output ratio storage section 234 may set the output ratio at which the sound including a human vice should be outputted to be more than that at which the sound not including a human voice should be outputted among the sounds stored in the sound storage section 220.

Additionally, the image storage section 210 may store the output ratio being a ratio of the number of times at which a plurality of sounds should be outputted for each image stored in the image storage section 210. Specifically, the output ratio storage section 234 stores image IDs stored in the image storage section 210, sound IDs, and output ratios. Then, the sound output control section 222 may select the sound among the plurality of sounds stored in association with each image ID for identifying the image to be outputted in order that the ratio of the output number of times is close to the output number of times stored in the output ratio storage section 234 and cause the sound output section 224 to output the same when the image is outputted from the image output section 214.

The limited number of times storage section 236 stores in association with the image IDs the limited number of times at which the sound is limited to be outputted when the sound stored in the sound storage section 220 is outputted from the sound output section 224. For example, the limited number of times storage section 236 increases the limited number of times stored in association with its sound ID by one for each time at which the sound is canceled to reproduce by fast-forwarding the sound by the user 180. Additionally, the limited number of times storage section 236 may increase the limited number of times stored in association with its sound ID for each time at which the volume of the sound reproduced by the sound output section 224 is reduced by turning the volume down by the user 180. Further, the limited number of times storage section 236 may increase the limited number of times stored therein depending on the amount of reducing of the sound reproduced by the sound output section 224. For example, the limited number of times storage section 236 may increase the stored limited number of times by one provided that the amount of reducing of the volume of the sound reproduced by the sound output section 224 is larger than a predetermined reference amount of reducing. Then, the limited number of times storage section 236 may increase the stored limited number of times by a predetermined increasing number of times (such as 1<0) depending on the amount of reducing of the sound volume when the amount of reducing of the sound volume is less than the predetermined reference amount of reducing.

Then, the target number of times storage section 232 sets the target number of times store in association with the sound IDs of the sounds stored in the limited number of times storage section 236 fewer times to be more times. The output ratio storage section 234 sets the output ratio stored in association with the sound IDs of the sounds stored in the limited number of times storage section fewer times to be more times. Therefore, the sound output control section 222 can frequently output the sound stored in the limited number of times storage section 236 fewer times by the sound output section 224. Here, the target number of times storage section 232 or the output ratio storage section 234 may calculate a certain limited ratio obtained by dividing the number of times stored in the limited number of times storage section 236 by the output number of times held by the output number of times holding section 230 to set the target number of times or the output ratio stored in association with the sound ID of the sound of which calculated limited ratio is smaller to be larger.

The target number of times storage section 232 may set the target number of times of the sound stored in the sound storage section 220 in association with the image capturing mode to be larger and store the same. The output ratio storage section 234 may set the output ratio of the sound stored in the sound storage section 220 in association with the image capturing mode to be larger and store the same. Therefore, the sound output control section 222 can output the sound recorded while the image capturing apparatus 100 is set to the image capturing mode by the sound output section 224 more frequently than the sound recorded while the image capturing apparatus 100 is set to the standby mode and the output mode. Here, the target number of times storage section 232 and the output ratio storage section 234 may store the target number of times and the output ratio weighted by an weighting factor indicated by the inverse number of the limited number of times, respectively. Additionally, the target number of times storage section 232 and the output ratio storage section 234 may calculate the target number of times and the output ratio of the sound stored in association with the image capturing mode by weighting the sound by the factor larger than the sound stored in association with the standby mode or the output mode.

Figure 8:
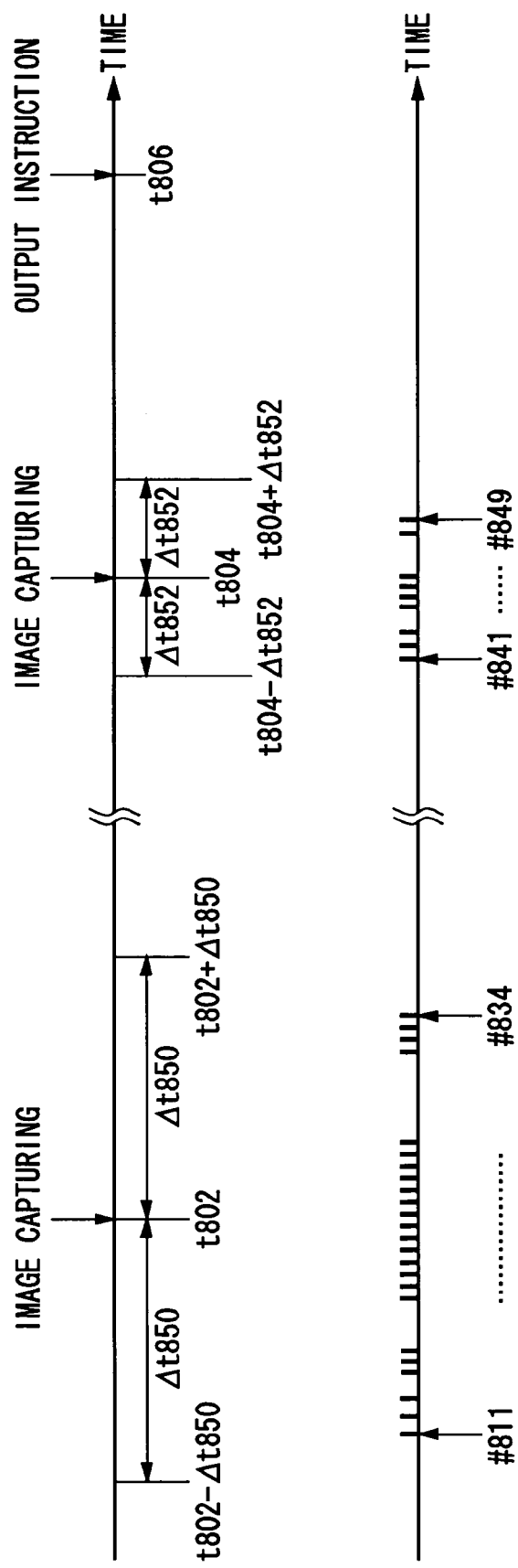
FIG. 8 shows an example of a time range for which a sound output control section 222 selects the sound.

FIG. 8 shows an example of a time range for which a sound output control section 222 selects the sound. For example, on receiving an instruction on outputting the image captured at a time t804 from the user 180 at a time 806, the output allowed time setting section 242 determines an allowed time Δt852 for selecting the sound to be outputted by the sound output section 224 based on the difference between the instructed output time and the time at which the image to be outputted was captured (t806−t804). Then, the sound output control section 222 selects the sound among the sounds (#841-#849) recorded within the time range before/after the time t804 by the Δt852 (the time t804−theΔ852~t804+theΔ852) and causes the sound output section 224 to output the same.

The sound output control section 222 may select the sound recorded from the time before the time t804 by the tolerance Δt852 to the time 804. Alternatively, the sound output control section 222 may select the sound recorded from the time 804 to the time after the time t804 by the tolerance Δt852.

The output allowed time setting section 242 sets the tolerance within which the sound to be outputted from the sound output section 224 is selected to be larger in proportion to the magnitude of the difference between the time at which the captured image stored in the image capturing section 210 was captured and the time at which the instruction on outputting was received. In FIG. 8, on receiving at the time t806 the instruction on outputting the image captured at the time t802 before the time t804, the output allowed time setting section 242 sets a tolerance Δt850 longer than the tolerance Δt852. Then, the sound output control section 222 selects the sound among the sounds (#811-#834) recorded within the time range from the time (t802−Δt850) to the time (t802+Δt850) and causes the sound output section 224 to output the same.

The output allowed time setting section 242 may set a period obtained by dividing the period between the time at which the image was captured and the instructed output time by a predetermined number as the tolerance. For example, the sound output control section 222 selects the sound among the sounds recorded in one day before/after the time at which the image was captured when the image captured ten days ago is outputted. Additionally, the sound output control section 222 selects the sound among the sounds recorded in four years before/after the time at which the image was captured when the image of the athletic festival at the third-grade level of the elementary school is outputted forty years later. In this case, the especial characteristic sounds at the entrance ceremony and the graduation ceremony of the elementary school are outputted while the user 180 appreciates the scene of the athletic festival, so that the user 180 can more enjoyably appreciate the image.

As thus described above, the output apparatus 140 selects the sound to be outputted among a plurality of sounds even if the same image is outputted again, so that the user 180 can easily appreciate the sound and image without getting bored.

Figure 9:
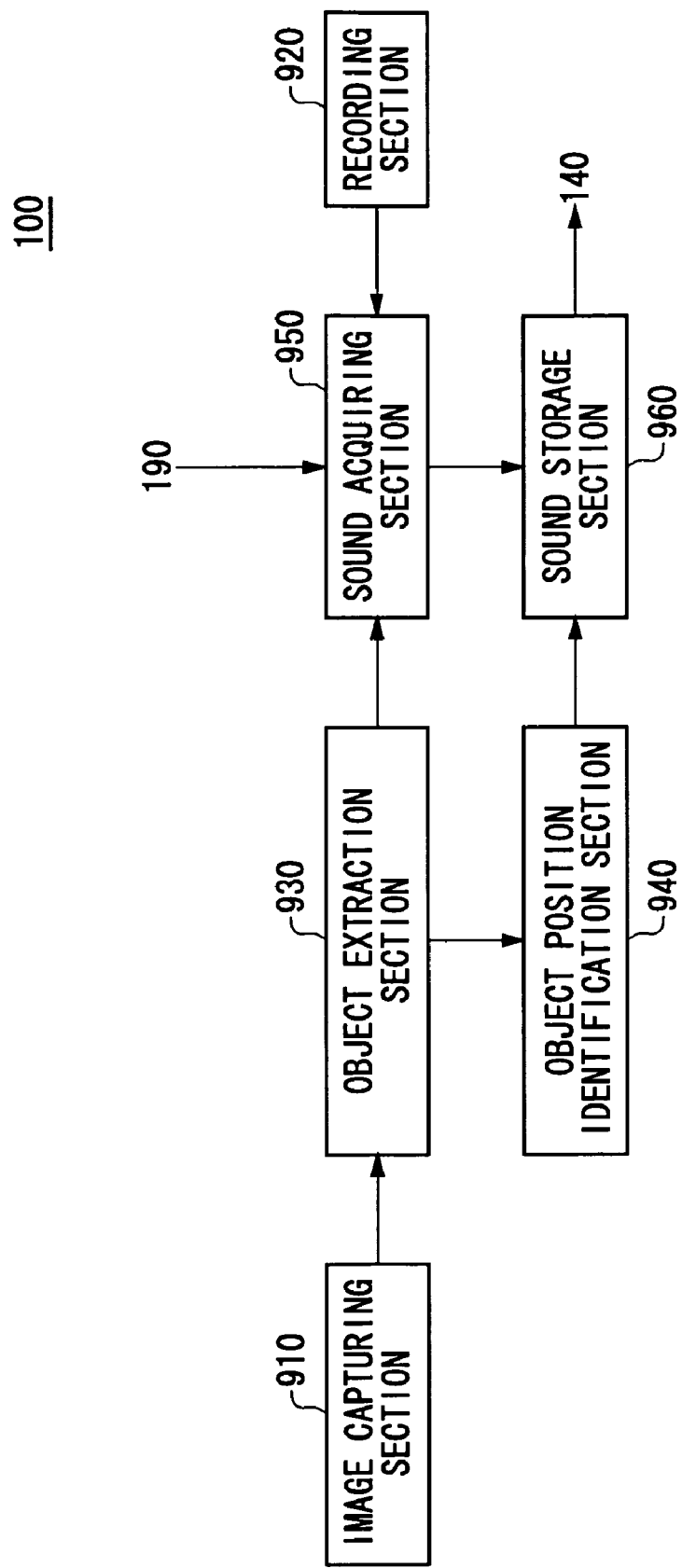
FIG. 9 shows an example of a block configuration of an image capturing apparatus 100 according to an embodiment of the present invention.
Figure 10:
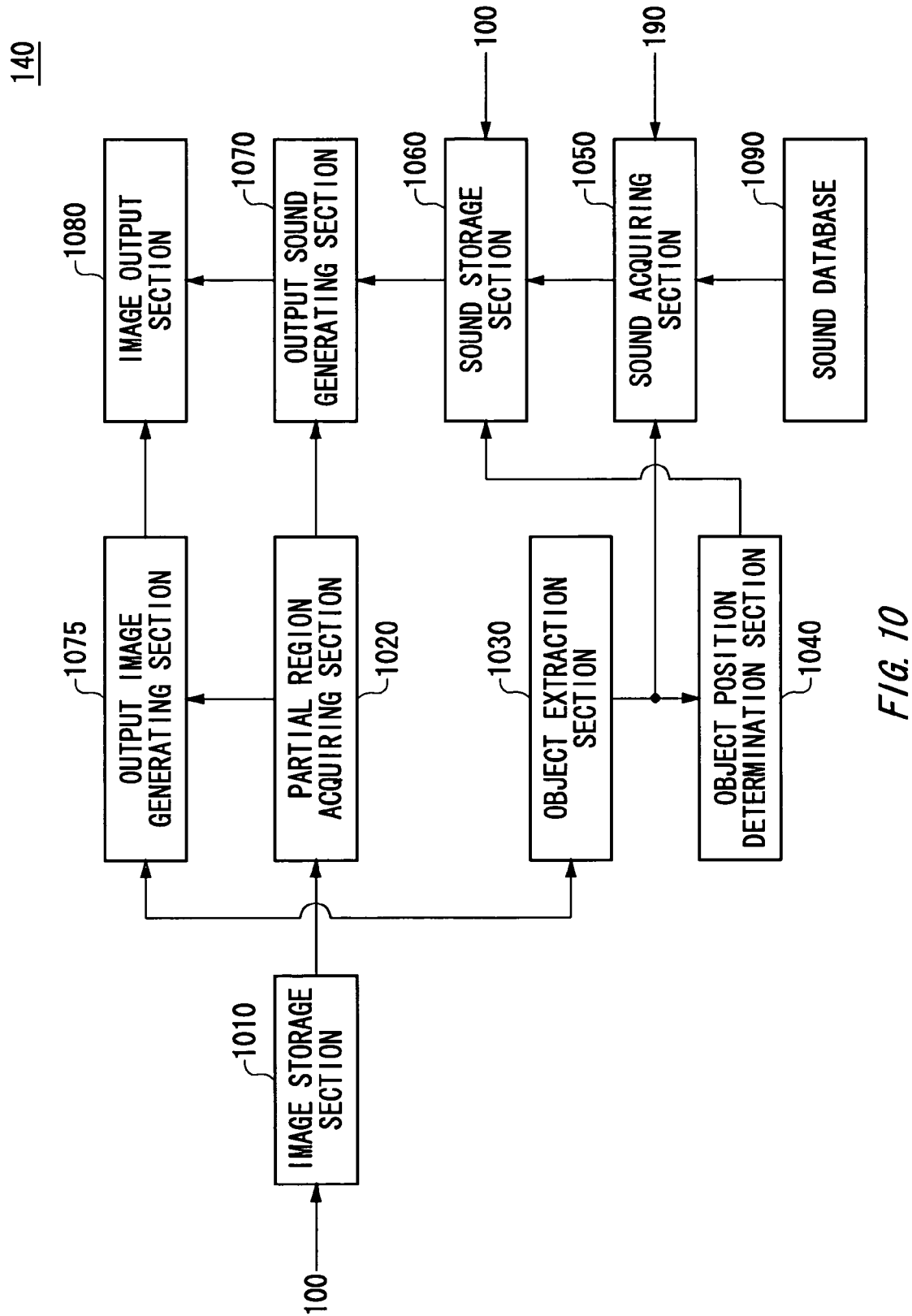
FIG. 10 shows another example of a block configuration of the output apparatus 140 according to an embodiment of the present invention.

FIG. 9 shows an example of a block configuration of an image capturing apparatus 100. FIG. 10 shows the block configuration in another embodiment of the output apparatus 140. The output apparatus 140 and the image capturing apparatus 100 according to the present embodiment generates an appropriate output sound for an output image generated using a plurality of trimming images obtained by trimming plurality of images or an image and synchronously outputs the sound and the image. The image capturing apparatus 100 includes an image capturing section 910, a recording section 920, an object extraction section 930, an object position identification section 940 and a sound acquiring section 950.

The image capturing section 910 captures images. The object extraction section 930 extracts the object included in the image captured by the image capturing section 910. The object position identification section 940 identifies the object position associated with the sound acquired by the sound acquiring section 950 in the image captured by the image capturing section 910.

The sound acquiring section 950 acquires a sound associated with the object extracted by the object extraction section 930. Specifically, the sound acquiring section 950 acquires the sound associated with the kind of the object extracted by the object extraction section 930 from the sound database for storing the sounds in association with the kind of object. Then, the sound storage section 960 stores the sound acquired by the sound acquiring section 950 in associated with the position of the object identified by the object position identification section 940.

The recording section 920 records sounds surrounding the image capturing section 910. Here, the microphone 102 described with reference to FIG. 1 may be a part of the recording section 920. The sound acquiring section 950 may extract the sound associated with the object extracted by the object extraction section 930 from the sounds recorded by the recording section 920. In this case, the object position identification section 940 identifies the position of the object associated with the sound extracted by the sound acquiring section 950 in the image captured by the image capturing section 910. Then, the sound storage section 960 stores the sound extracted by the sound acquiring section 950 in association with the object position identified by the object position identification section 940.

The output apparatus 140 includes an image storage section 1010, an object extraction section 1030, an object position identification section 1040, a sound acquiring section 1050, a sound storage section 1060, a partial region acquiring section 1020, an output sound generating section 1075, an image output section 1080 and a sound database 1090.

The image storage section 1010 stores images. Specifically, the image storage section 1010 receives the image captured by the image capturing apparatus 100 therefrom and stores the same. The sound storage section 1060 stores the sound in association with the image stored in the image storage section 1010 and the position of the image. Specifically, the sound storage section 1060 acquires the sound recorded in association with the image captured by the image capturing apparatus 100 and the position in the image from the sound storage section 1060 of the image capturing apparatus 100.

The partial region acquiring section 1020 acquires a partial region including at least a part of the image stored in the image storage section 1010. For example, the partial region acquiring section 1020 accepts a trimming operation on the image stored in the image storage section 1010 by the user 180 and acquires a trimming range indicated by the trimming operation as the range of the partial region.

The output image generating section 1075 generates an output image from the image within the partial region acquired by the partial region acquiring section 1020 in the image stored in the image storage section 1010. The output sound generating section 1070 generates an output sound from the sound stored in the sound storage section 1060 in association with the position in the total image at which the partial region acquired by the partial region acquiring section is located in the image stored in the image storage section 1010.

Then, the image output section 1080 outputs an output image generated by the output image generating section 1075 and an output sound generated by the output sound generating section 1070 in association with each other in order to synchronously output them. Here, the image output section 1080 may record the output image and the output sound in association with each other on a recording media. Additionally, the image output section 1080 may output the output image and the output sound in association with each other in order to output the output sound from a reproducing device such as a speaker in synchronism with displaying the output image on a display device. Therefore, the output apparatus 140 can reproduce the appropriate sound such as the representative sound of the object included in the trimming image in synchronism with the trimming image when the trimming image acquired by the trimming operation by the user 180 is displayed.

The output image generating section 1075 may combine the image within the partial region acquired by the partial region acquiring section 1020 in the image stored in the image storage section 1010 with the other images stored in the image storage section 1010 to generate an output image. In this case, the sound generating section 1070 generates an output sound by the sound stored in the sound storage section 1060 in association with the position in the total image at which the partial region acquired by the partial region acquiring section 1020 is located and the sound stored in the sound storage section 1060 in association with the other images included in the output image. Therefore, the output apparatus 140 can reproduce the sound which can be acquired by combining the sounds associated with the image used for editing in synchronism with displaying the edited image when the image obtained by editing a plurality of images is displayed.

The sound database 1090 stores the sounds in association with the kind of objects. Then, the sound storage section 1060 acquires the sound stored in the sound database 1090 in association with the kind of the object located at the position associated with the image stored in the image storage section 1010 and stores the same. Here, the sound storage section 1060 may acquire the sound stored in a sound database outside of the output apparatus 140 in association with the kind of the object located at the position in association with the image stored in the image storage section 1010.

Then, the output sound generating section 1070 may generate an output sound obtained by enhancing the sound stored in the sound storage section 1060 in association with the position in the total image at which an object occupying larger dimension in the output image is located and the image including the object. Specifically, the output sound generating section 1070 may generate an output image obtained by combining the sound stored in the sound storage section 1060 in association with the position in the total image at which an object occupying larger dimension in the output image is located and the image including the object with larger volume.

Additionally, the output sound generating section 1070 may generate an output image obtained by enhancing the sound stored in the sound storage section 1060 in association with the position in the total image at which an object disposed at more front in the output image is located and the image including the object. Specifically, the output sound generating section 1070 generates an output sound obtained by combining the sound stored in the sound storage section 1060 in association with the position in the total image at which an object disposed at more front in the output image is located and the image including the object with larger volume.

The output image generating section 1075 may generate output sounds by sequentially outputting the plurality of sounds stored in the sound storage section 1060 in association with each of the plurality of images used for generating the output image. In this case, the output sound generating section 1070 may generate output sound by outputting for longer times the sound stored in the sound storage section 1060 in association with the position in the total image at which an object occupying larger dimension in the output image is located and the image including the object. Additionally, the output sound generating section 1070 may generate output sound by outputting for longer times the sound stored in the sound storage section 1060 in association with the position in the total image at which an object disposed at more front in the output image is located.

As described above, the output apparatus 140 can reproduce the image generated using the trimming image acquired by freely trimming images by the user 180 along with the sound of the object shown on the image. Therefore, it can be prevented before that an undesirable sound is reproduced, for example, the sound associated with the object eliminated by trimming is reproduced along with the output image. Additionally, the output apparatus 140 can provide the sound obtained by enhancing the sound associated with more enhanced object in a composite image along with the composite image to the user 180.

The sound storage section 1060 may store a plurality of sounds in association with each of the plurality of images stored in the image storage section 1010. Then, the output image generating section 1075 may combine the plurality of images stored in the image storage section 1010 to generate an output image. For example, the output image generating section 1075 generates an output image by positioning the plurality of images selected by the user 180 in the layout designated by the user 180. In this case, the output sound generating section 1070 generates an output sound using a first sound and a second sound stored in the sound storage section 1060 in association with each of a first image and a second image included in the output image generated by the output image generating section 1075. Here, the output sound generating section 1070 generates an output sound obtained by enhancing the first sound than the second sound and combining them when the first image is enhanced than the second image in the output image generated by the output image generating section 1075. Therefore, the output apparatus 140 can output the output sound obtained by enhancing the sound associated with the image emphatically positioned in the output image by the user 180 in synchronism with the output image.

Specifically, the output sound generating section 1070 generates an output sound obtained by enhancing the first sound than the second and combining them when the fist image is larger than the second image in the output image generated by the output image generating section 1075. Additionally, the output sound generating section 1070 generates an output sound obtained by enhancing the first sound than the second sound and combining them when the first image is in front of the second image in the output image generated by the output image generating section 1075. Further, the output sound generating section 1070 generates an output sound obtained by enhancing the first sound than the second sound and combining them when the first image is located more center than the second image in the output image generated by the image generating section 1075. Here, the output sound generating section 1070 may generate an output sound obtained by combining the first sound and the second sound having the volume smaller than that of the first sound when the first image is enhanced than the second image in the output image generated by the image generating section 1075.

Figures 11, 12:
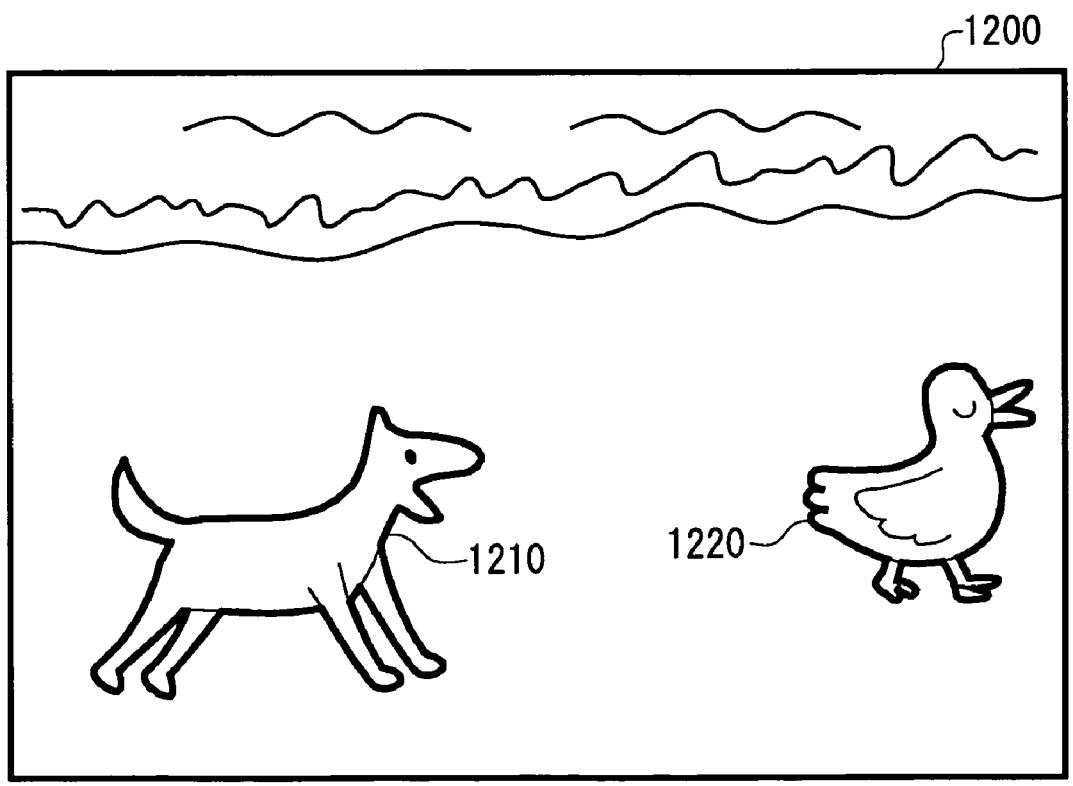
FIG. 11 shows an example of data stored in a sound database 1090 according to an embodiment of the present invention.
FIG. 12 shows an example of an image stored in an image storage section 1010 according to an embodiment of the present invention.

FIG. 11 shows an example of data stored in a sound database 1090. The sound database 1090 stores the kind of objects and sound data. For example, the sound database 1090 stores the representative sound for each object, such as a bark of dog, a bird call and sound of the waves in association with each kind of objects, such as a dog, a bird and waves. Here, the sound database 190 may store data same as the data stored in the sound database 1090 as shown in FIG. 11.

FIG. 12 shows an example of an image 1200 stored in an image storage section 1010. Now, an operation when the sound acquiring section 1050 acquires sounds will be described with reference to the image 1200 in FIG. 12. The object extraction section 1030 extracts the outline of objects such as a dog 1210 and a bird 1220 from the image 1200 using an edge extraction. Then, the object extraction section 1030 identifies the kind of object having the coincidence higher than a predetermined value and having the maximum coincidence by pattern-matching the pattern of the object previously stored for each kind of objects such as a dog and a bird with the extracted outline. Then, the sound acquiring section 1050 acquires the sound stored in the sound database 1090 or the sound database 190 in association with the identified kind of object.

The sound acquiring section 950 of the image capturing apparatus 100 can acquire the sound from the sound database 190 in association with the object of the image captured by the image capturing section 910 through the operation same as that of the sound acquiring section 1050. Additionally, the sound acquiring section 950 previously stores the amount of characteristic of sound in association with the kind of object. Then, the sound acquiring section 950 may compare the stored amount of characteristic of the sound with the amount of characteristic of the sound recorded by the recording section 920 and extract the sound having the amount of characteristic being higher than the predetermined coincidence and having the maximum coincidence from the sound recorded by the recording section 920. Here, the amount of characteristic of the sound may be a characteristic frequency spectrum of the sound and a characteristic time change pattern of the frequency spectrum.

FIG. 13 shows an example of data stored in a sound storage section 960 or a sound storage section 1060. Now, the data stored in the sound storage section 1060 will be described as an example. The sound storage section 1060 stores image IDs for identifying images captured by the image capturing section 910, positions in the total image at which the object included in the image is located and sound data acquired by the sound acquiring section 1050. Here, the object position identification section 1040 identifies the barycentric position of the object extracted by the object extraction section 1030. Then, the sound storage section 1060 stores the barycentric position of the object identified by the object position identification section 1040 as the position in the total image of the object. Here, the sound storage section 1060 may store the relative value to the height and the width of the image indicative of the position in the total image. Specifically, the sound storage section 1060 stores the relative coordinate to the height and the width based on the lower left of the image.

The sound storage section 1060 may store the sound in association with the image without associating with the position in the total image. As shown in FIG. 13, the sound storage section 1060 stores sound data 13 in association with an image ID #AAA, and also stores sound data 22 in association with an image ID #BBB. In this case, the sound storage section 1060 stores a value indicating that it is not associated with the position in the total image (such as null) as the position in the total image for the sound data 13 and 22. Hereinbefore, the data stored in the sound storage section 1060 has been described, then, the sound storage section 960 may store data same as the data stored in the sound storage section 1060.

FIG. 14 shows an example of the output image generated by an output image generating section 1075. As shown in FIG. 14, the output apparatus 140 generates an output image 1450 by the image identified by the image ID #AAA and the image 1400 identified by the image ID #BBB and displays the same. The output generating section 1075 positions a partial image 1411 and a partial image 1412 within the range acquired by the partial region acquiring section 1020 according to a trimming instruction by the user 180 in a layout designated by the user 180 to generate the output image 1450.

At this time, the output sound generating section 1070 calculates the dimension of the image 1200 and the image 1400 included in the output image 1450. Then, the output sound generating section 1070 combines the sound 13 and the sound 22 stored in the sound storage section 1060 in association with the image 1200 and 1400 with the volume in proportion to the dimension of the image 1200 and 1400 in the output image 1450 to generate an output sound. Thereby, the sound including children's voice (sound data 22) recorded when the image 1400 (#BBB) occupying a large dimension in the output image 1450 is reproduced with a large volume. Therefore, the sound recorded when the image having a small dimension (#AAA) included in the output image 1450 was captured is not reproduced with a large volume, so that the user can appreciate the output image without any uncomfortable feeling.

Additionally, the output sound generating section 1070 may generate an output sound depending on the dimension of the object in the output image 1450. Specifically, the output sound generating section 1070 calculates the dimension of the object in the output image (such as a dog object 1421 and a sea object 1422) included in the range acquired by the partial region acquiring section 1020. Then, the output sound generating section 1070 acquires the sound data 11 and 21 stored in the sound storage section 1060 in association with each position in the total image of the objects 1421 and 1422, the image IDs of the images 1200 and 1400 and combines the acquired sound data 11 and 12 with the volume in proportion to the dimension of the object to generate an output sound. Here, the output sound generating section 1070 may generate identification information for identifying sound data used for the output sound and sound volume information indicative of the volume of the sound data as an output sound instead of the sound data in itself. As described above, when the output image 1450 is displayed by the output apparatus 140, sound of the waves is reproduced with the volume larger than that of the bark of a dog. Thus, the output apparatus 140 allows the user 180 to appreciate the image generated by freely editing by the user 180 along with the sound without any uncomfortable feeling about the content of the image.

Here, the case that the output sound generating section 1070 combines the sound with the volume depending on the dimension of the image or the object in the output image 1450 has been described with reference to FIG. 14. Additionally, the output sound generating section 1070 may determine the combination ratio of the sound depending on the layout of the image or the object in the output image 145 in addition to the dimension. For example, the output sound generating section 1070 may combine sounds with the combination ratio weighted by the weighting factor in proportion to the inverse number of the distance to the center of the output image 1450. Additionally, the output sound generating section 1070 may set the weighting factor of the sound corresponding to the image or the object disposed in more front in the output image 1450 to be larger. Here, the composition ratio of the sound may be a composition ratio of the sound volume as described with reference to FIG. 14, or may be a composition ratio to the time for which the sound is reproduced. Additionally, the output sound generating section 1070 may generate the sound corresponding to the image or the object having the maximum dimension in the output image 1450 as an output sound. Further, the output sound generating section 1070 may generate the sound corresponding to the image or the object in the image disposed in the most front among the images and objects in the output image 1450 as an output sound.

Figure 15:
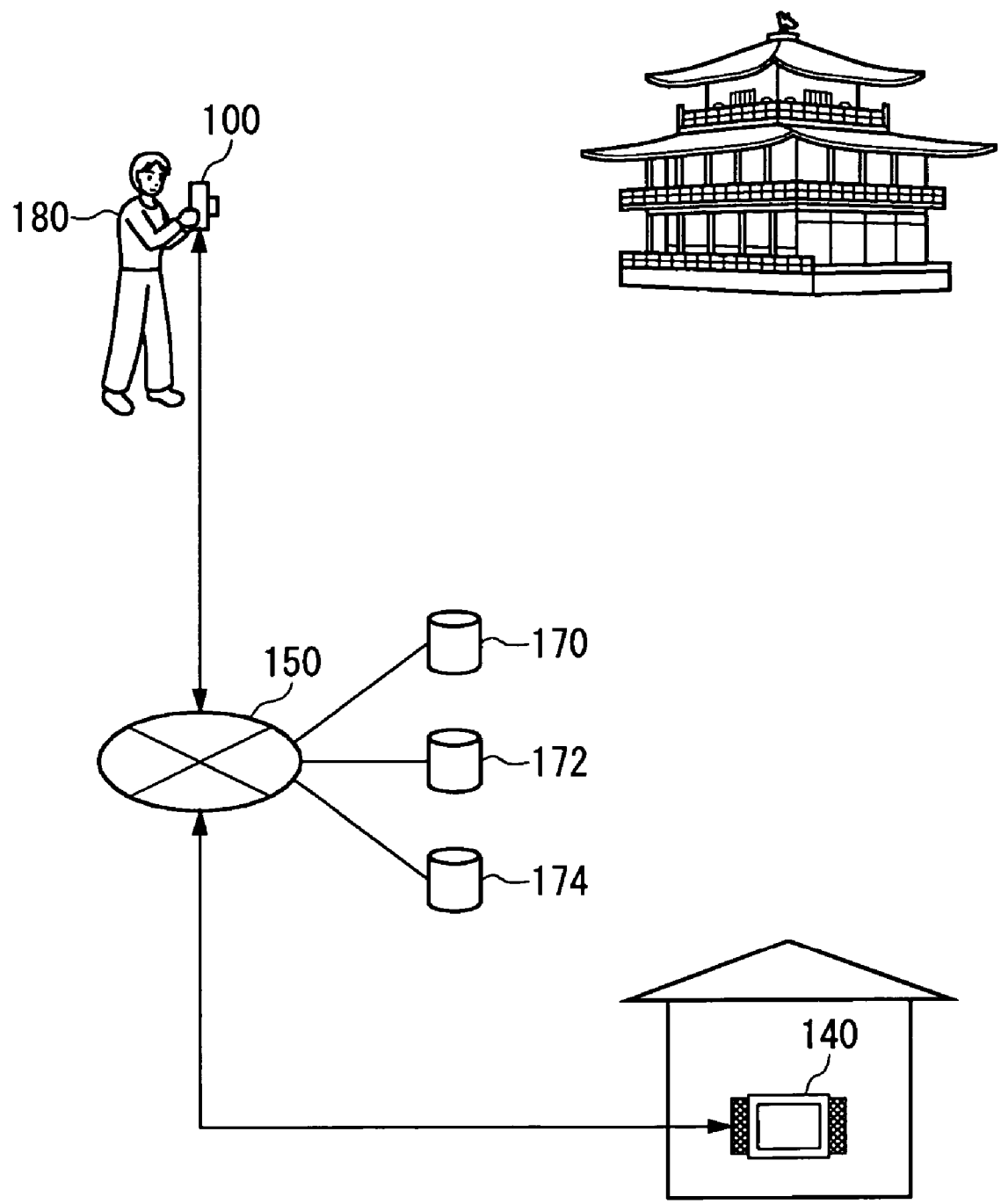
FIG. 15 shows an example of a sound provision system according to another embodiment of the present invention.

FIG. 15 shows an example of a sound provision system according to a second embodiment of the present invention.

The sound provision system includes an image capturing apparatus 100, an output apparatus 140, an explanation sound database 170, a music database 172 and an environmental sound database 174. In the present embodiment, the image capturing apparatus 100 captures souvenir pictures in the sightseeing spot. The image capturing apparatus 100 transmits the image captured by the image capturing apparatus 100 and the image-capturing position thereof to the output apparatus 140 through the communication line 150 such as Internet. The music database 172 stores plural pieces of music therein. The environmental sound data base 174 individually stores a plurality of environmental sounds for each kind of environmental sounds. Here, the music database 172 and the environmental sound database 174 according to the present embodiment are examples of the sound database of the present invention.

The output apparatus 140 acquires the sound data regarding the image capturing position received from the image capturing apparatus 100, such as sound data for explaining the feature of the sightseeing spot from the explanation sound database 170 and outputs the same along with the image received from the image capturing apparatus 100. Here, the image capturing apparatus 100 may record the sounds surrounding the image capturing apparatus 100. The output apparatus 140 may receive the sounds recorded by the image capturing apparatus 100. Then, the output apparatus 140 may extract the music among the sounds, acquire the music same as the extracted music from the music database 172 and output the same along with the image. Additionally, the output apparatus 140 may extract the environmental sound, such as sound of waves and a bird call among the sounds from the environmental sound database 174, acquire the environmental sound of which kind is same as that of the extracted environmental sound from the environmental sound database 174 and output the same along with the image. Here, the output apparatus 140 may synchronously output the sound data acquired from the explanation sound database 170 and the music acquired from the music database 172 or the environmental sound acquired from the environmental sound database 174.

The output apparatus 140 may be an apparatus for outputting images and sounds such as a HDTV, an electronic photostand and computer. Additionally, the output apparatus 140 may output sounds as characters. For example, the output apparatus 140 displays lyrics included in the sounds acquired from the explanation sound database 170 and/or music data acquired from the music database 172 as the characters on the display device such as a LCD while the image is displayed on the display device. Here, the output apparatus 140 may display the characters on the display device for displaying images or the other display. Additionally, the output apparatus 140 may be a printing device for printing images, such as a printer and also may print sounds as characters during printing images.

The image capturing apparatus 100 may be such as a digital still camera and a camera cell-phone. The image capturing apparatus 100 may record image and sound data on a recording medium and the output apparatus 140 may receive the image and sound data from the recording medium. Further, the image capturing apparatus 100 may store the directories associated with the directories provided for each user 180 in a server connected to the communication line 150, such as the directories associated with the image capturing apparatus 100. Then, the output apparatus 140 may receive the image and sound data stored in the server for each user 180.

As thus described above, the output apparatus 140 can provide the image captured by the image capturing apparatus 100 along with the sound associated with the location at which the image is captured to the user 180. Therefore, the user 180 can enjoyably appreciate the images as reminding the feature of the sightseeing spot. Additionally, the output apparatus 140 can provide the environmental sound, such as the background music and the surrounding sound of the waves when the image was captured by the image capturing apparatus 100 to the user 180. Therefore, the user 180 can enjoyably appreciate the images as listening to the music in currency at that point in time.

Figure 16:
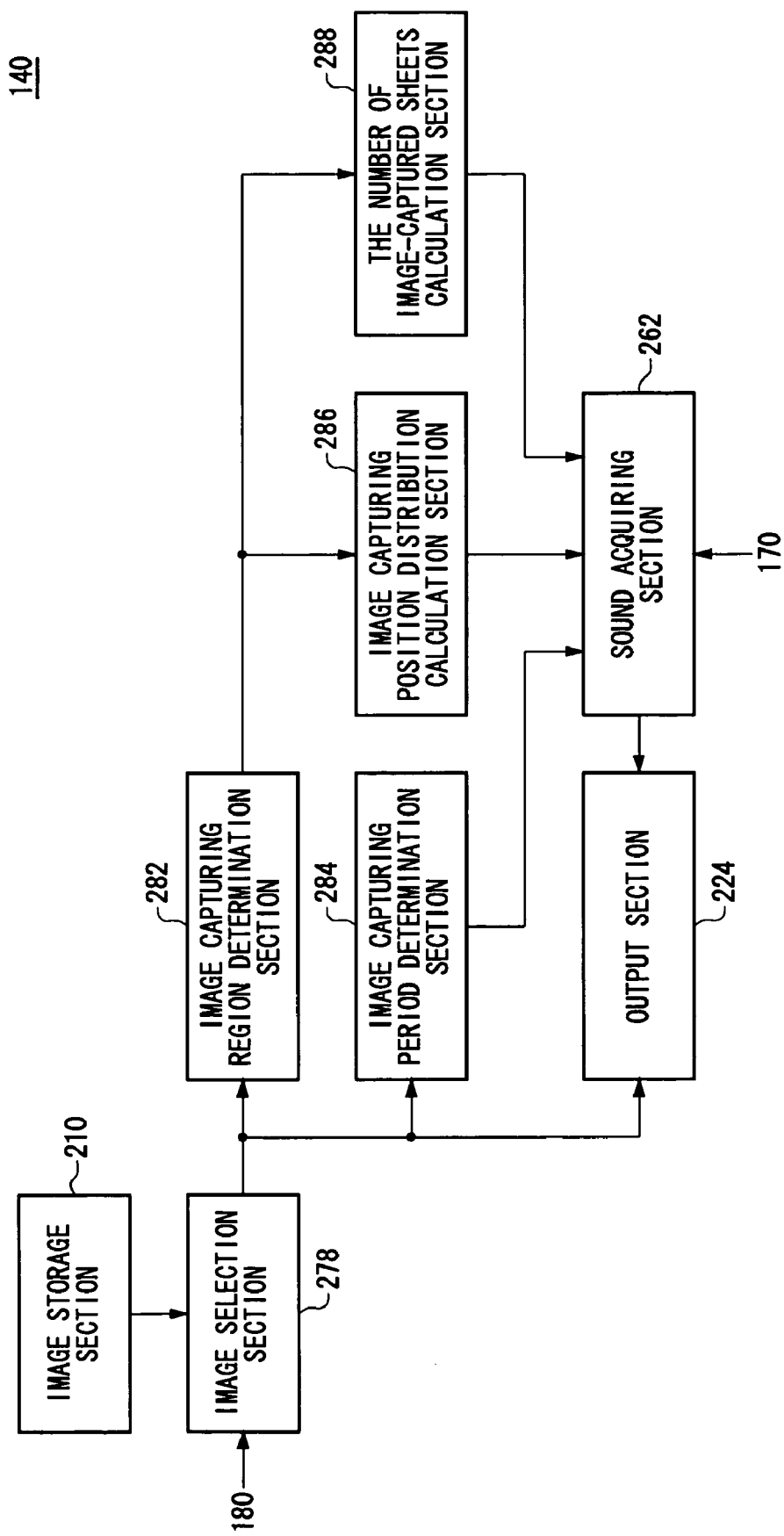
FIG. 16 shows an example of a block configuration of an output apparatus 140 according to another embodiment of the present invention.

FIG. 16 shows an example of a block configuration of the output apparatus 140. The output apparatus 140 includes an image capturing section 210, an image selection section 278, an image capturing region determination section 282, an image capturing period determination section 284, an image capturing position distribution calculation section 286, the number of image-captured sheets calculation section 288, an output section 224 and a sound acquiring section 262.

The image storage section 210 stores the captured image and the position at which the image is captured in association with each other. For example, the image capturing apparatus 100 receives latitude and longitude information regarding the position of the image capturing apparatus 100 at image capturing from Global Positioning System satellite. Then, the image storage section 210 stores the image received from the image capturing apparatus 100 in association with the latitude and longitude information detected by the image capturing apparatus 100.

The image selection section 278 selects a plurality of images from images stored in the image storage section 210 based on the instruction by inputting by the user 180. The image capturing region determination section 282 determines the image capturing region including a plurality of image capturing positions at which each of the plurality of images stored in the image storage section 210 is captured.

Specifically, the image capturing region determination section 282 determines the image capturing region including the plurality of positions at which each of the plurality of images selected by the image selection section 278 is captured. For example, the image capturing region determination section 282 may determine the geographical range of the image capturing region including the image capturing positions at which each of the plurality of images stored in the image storage section 210 is captured, such as a latitudinal and longitude range.

The image capturing position distribution calculation section 286 calculates the distribution of the plurality of positions at which each of the plurality of images stored in the image storage section 210 is captured in the image capturing region determined by the image capturing region determination section 282. The number of image-captured sheets calculation section 286 calculates the number of sheets for which each of the plurality of images stored in the image storage section 210 is captured.

The sound acquiring section 262 acquires the sound stored in the explanation sound database 170 according to the dimension of the image capturing region determined by the image capturing region determination section 282. Specifically, the sound acquiring section 262 acquires the sound with more detailed explanation regarding the image capturing region determined by the image capturing determination section 282 when the dimension of the image capturing region determined by the image capturing region determination section 282 is smaller.

More specifically, the sound acquiring section 262 acquires the sound with the explanation regarding the partial region in which distribution density calculated by the image capturing position distribution calculation section 286 is higher than a predetermined density. Additionally, the sound acquiring section 262 acquires the sound with more detailed explanation among the plurality of explanations with different degree of the detail each other regarding the partial region stored in the explanation sound database 170.

The output section 224 outputs the sounds acquired by the sound acquiring section 262 along with the plurality of images stored in the image storage section 210. Specifically, the output section 224 outputs the sound acquired by the sound acquiring section 262 along with the plurality of images selected by the image selection section 278.

The image storage section 210 further stores the time at which the image is captured in association with the captured image. The image capturing period determination section 284 determines the image capturing period including a plurality of times at which each of the plurality of images stored in the image storage section 210 is captured. Specifically, the image capturing period determination section 284 determines the image capturing period including the plurality of times at which the plurality of images selected by the image selection section 278 are captured.

Then, the sound acquiring section 262 further acquires the sound stored in the explanation sound database according to the length of the image capturing period determined by the image capturing period determination section 284. Specifically, the sound acquiring section 262 acquires the sound with more detail explanation regarding the image capturing region determined by the image capturing region determination section 282 when the image capturing period determined by the image capturing period determination section 284 is longer.

FIG. 17 shows a table indicative of an example of data stored in an explanation sound database 170. The explanation sound database 170 stores the sound data regarding a region and a range within which the region is located in association with the region. The range may include the longitude and latitude being the staring point and the end point of the region. Here, the range may include a plurality of ranges at which the regions are located. The sound data may include a plurality of data with different detail each other regarding each of the regions, such as sound data of a brief description and a detailed description. Additionally, the sound data may include news regarding each of the regions.

For example, the brief description data about Japan may be sound data for describing the feature, population and area of the whole of Japan. The detailed description data about Japan may be sound data for describing the feature, population and area for each region in Japan, and also may be sound data for describing Japanese history.

FIG. 18 shows an example of the distribution of the positions at which images are captured. As shown in FIG. 18, the image storage section 210 stores ten sheets, nine sheets, seven sheets, eight sheets and six sheets of images which are captured in Nagasaki, Hiroshima, Kyoto, Shizuoka, Tokyo and Hokkaido, respectively. The image capturing region determination section 282 divides the image into partial regions for each range by a predetermined longitude and latitude to determine a partial region including the position at which the image is captured. The number of image-captured sheets calculation section 288 calculates the number of sheets of the images captured at each of the partial regions. Then, the image capturing position distribution calculation section 286 determines the distribution of the partial regions including the positions at which the images are captured.

Then, the sound acquiring section 262 determines whether the image capturing positions are distributed to a wide range. For example, the sound acquiring section 262 determines that the image capturing position is distributed among the small range when the image captured at Nagasaki is selected by the image selection section 278, and then, the sound acquiring section 262 acquires sound data for describing about Nagasaki as the sound data of the detailed description about Japan from the explanation sound database 170. Additionally, when the images captured in Nagasaki, Hiroshima, Kyoto, Shizuoka, Tokyo and Hokkaido, respectively are selected by the image selection section 278, the sound acquiring section 262 determines that the image capturing positions are distributed to wider range and acquires the sound data for describing about Japan as the sound data of the brief description about the image capturing regions from the explanation sound database 170.

Here, when the number of sheets calculated by the number of image-captured sheets calculation section 288 is larger, the sound acquiring section 262 may acquire the sound data of more detailed description about each of the image capturing regions from the explanation sound database 170. Alternatively, when the number of sheets calculated by the number of image-captured sheets calculation section 288 is smaller, sound acquiring section 262 may acquire the sound data of the more brief description about each of the image capturing regions from the explanation sound database 170.

Additionally, the sound acquiring section 262 calculates the ratio of the number of sheets of the images captured at a specified partial region to the selected number of sheets, and then, when the ratio is larger than a predetermined ratio, the sound acquiring section 262 acquires the sound data for describing about the specified partial region from the explanation sound database 170. For example, when the image storage section 210 stores six sheets, seven sheets, thirty sheets, four sheets and three sheets of images coming to a grand total of fifty sheets of images which are captured in Nagasaki, Hiroshima, Kyoto, Tokyo and Hokkaido, respectively, where, thirty sheets more than half of them are the images captured in Kyoto, the sound acquiring section 262 acquires sound data for describing about Kyoto from the explanation sound database 170. Therefore, the output apparatus 140 can provide the sound for describing about the location at which the images are captured by the user particularly many times.

FIG. 19 shows an example of the distribution of the times at which images are captured. The image capturing period determination section 284 determines the time range at which the image is captured for each partial region. For example, the image capturing period determination section 284 determines time ranges (t1-t10, t11-t19, t20-t29, t30-t36, t37-t44 and t45-t50) for which images are captured in partial regions including Nagasaki, Hiroshima, Kyoto, Shizuoka, Tokyo and Hokkaido, respectively.

Then, the sound acquiring section 262 determines the length of the image capturing period. For example, when the image captured in Nagasaki is selected by the image selection section 278, the sound acquiring section 262 determines that the period (t1-t10) for which images are captured in Nagasaki is relatively short and acquires the sound data for describing about Nagasaki from the explanation sound database 170. Additionally, when the images captured in Nagasaki, Hiroshima, Kyoto, Shizuoka, Tokyo and Hokkaido are selected by the image selection section 278, the sound acquiring section 262 determines that the period (t1-t50) is relatively long and acquires the sound data of the detailed description about Japan as the sound data for describing about the image capturing regions from the explanation sound database 170.

The sound acquiring section 262 calculates the rate of the period for which the image is captured in the specified partial region to the period for which the selected image is captured, and then acquires the sound data for describing about the specified partial region from the explanation sound data base 170 when the ratio is larger than a predetermined ratio. For example, when the image storage section 210 stores images captured in Nagasaki, Hiroshima, Kyoto, Tokyo and Hokkaido, the sound acquiring section 262 acquires the sound data about Kyoto from the explanation sound database 170 provided that the period for which the image is captured (t64-t93) in Kyoto is more than half period of the total period for which the selected image is captured (t51-t56, t57-63, t64-t93, t94-t97 and t98-t10). Therefore, the output apparatus 140 can provide the sound for describing about the location at which the user 180 stayed particularly long time and captured the images to the user 180.

Figure 20:
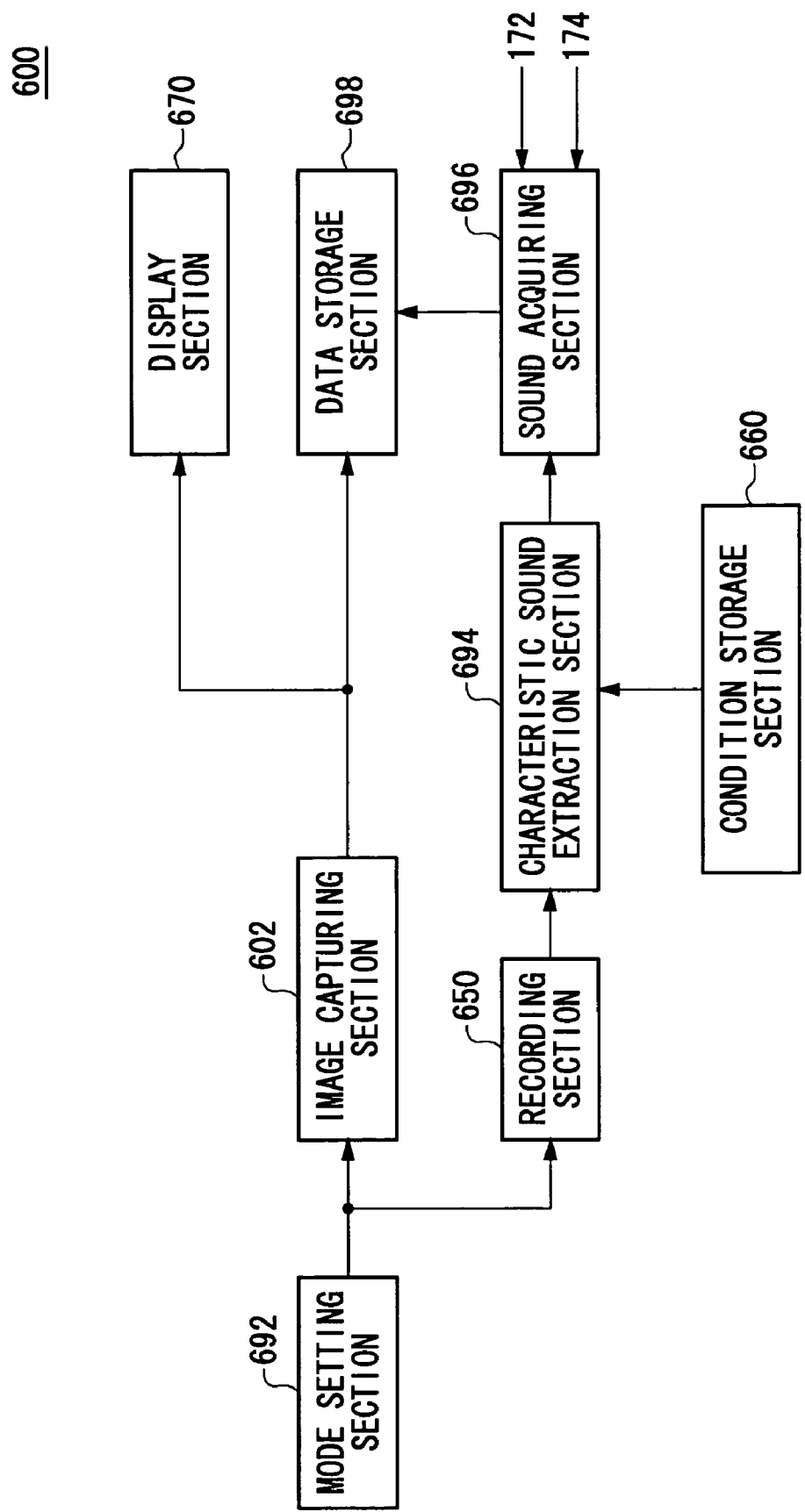
FIG. 20 shows an example of a block configuration of an image capturing apparatus 600 according to another embodiment of the present invention.

FIG. 20 shows an example of a block configuration of an image capturing apparatus 600. The image capturing apparatus 600 is another example of the image capturing apparatus 100 described with reference to FIG. 15. Particularly, the image capturing apparatus 600 has a function for extracting a characteristic sound such as music and an environmental sound from the sound recorded along with the captured image and storing the same. The image capturing apparatus 600 includes a mode setting section 692, an image capturing section 602, a display section 670, a data storage section 698, a recording section 650, a characteristic sound extraction section 694, a condition storage section 660 and the sound acquiring section 696.

The image capturing section 602 captures images. Specifically, the image capturing section 602 receives light from a subject by an image capturing device such as a CCD to capture an image of the subject. Here, the image capturing section 602 may continuously capture the subject at a predetermined time interval. Then, the image capturing section 602 may hold a predetermined number of images which are continuously captured. The image capturing section 602 may determine the image captured at the timing proximate to the instructed image-capturing time among the images held in the image capturing section 602 as the captured image.

The display section 670 displays the image of light received by light receiving elements included in the image capturing section 602. The mode setting section 692 sets the image capturing apparatus 600 to an image capturing mode in which the display section 670 displays an image or an non-image capturing mode in which the display section 670 does not display any image.

The recording section 650 records sounds surrounding the image capturing section 602. Here, the recording section 650 records the sounds surrounding the image capturing section 602 in both of the case that the mode setting section 692 sets the image capturing mode and the case that the mode setting section 692 sets the non-image capturing mode.

The characteristic sound extraction section 694 extracts a predetermined kind of sound from the sounds recorded by the recording section 650. For example, the characteristic sound extraction section 694 extracts music from the sounds recorded by the recording section 650. In this case, the characteristic sound extraction section 694 extracts the fundamental frequency based on the fundamental frequency of the sound to determine the scale. Then, the characteristic sound extraction section 694 determines the amount of characteristic of music, such as rhythm, tempo and tonality based on the determined scale to extract note data. Additionally, the characteristic sound extraction section 694 may extract the chord progression of music based on the note data.

The condition storage section 660 previously store the condition to identify each kind of the environmental sounds extracted by the characteristic sound extraction section 694. Specifically, the condition storage section 660 stores the characteristic frequency spectrum for each kind of the environmental sounds, such as a bark of dog, a bird call and sound of the waves. Then, the characteristic sound extraction section 694 extracts the environmental sound corresponding to the condition stored in the condition storage section 660 from the sounds recorded by the recording section 650. For example, the characteristic sound extraction section 694 extracts the environmental sound corresponding to the frequency spectrum stored in the condition storage section 660 with more predetermined coincidence from the sounds recorded by the recording section 650. Here, the condition sound extraction section 694 may store the environmental sound in itself for each kind thereof. In this case, the characteristic sound extraction section 694 may compares the environmental sound stored in the condition storage section 660 with the sound recorded by the recording section 650 and extract the environmental sound of which amount of characteristic (such as a frequency spectrum) corresponds to most the sound in the condition storage section 660 to determine the kind of the environmental sound.

The characteristic sound extraction section 694 extracts the predetermined kind of sound from the sounds recorded by the recording section 650 within a predetermined period since the image capturing section 602 captures the image. For example, the characteristic sound extraction section 694 extracts the music or the environmental sound from the sounds recorded by the recording section 650 within a predetermined period since the image capturing section 602 captures the image. Specifically, the characteristic sound extraction section 694 extracts the predetermined kind of sound from the sounds recorded by the recording section 650 within the preset period equal to or longer than the period for which the mode setting section 692 sets the image capturing mode. More specifically, the characteristic sound extraction section 694 extracts the music or the environmental sound from the sounds recorded by the recording section 650 within the preset period equal to or longer than the period for which the mode setting section 692 sets the image capturing mode.

The music database 172 stores plural pieces of music for each age. Additionally, the music database 172 stores the plural pieces of music for each genre. Specifically, the music database 172 stores the genre and the age of music in association with music data. The sound database 172 may store the amount of characteristic of music, such as note data, rhythm, tempo, tonality and chord progression in association with the music data. Additionally, the music database 172 may store the persons associated with the music, such as a composer, a song writer, an arranger and a player in association with the music data. Further, the music database 172 may store a broadcasting position indicative of the position of the area from which the music is broadcasted, a broadcasting time and broadcasting means in association with the music data. Here, the broadcasting means may be such as a radio and a cable broadcasting. The broadcasting time may be information indicative of the time at which the music should be broadcasted, such as program data of a broadcasting station. The sound database 172 may store information indicative of hit degree of the music in a plurality of areas for each area and age in association with the music data.

The sound acquiring section 696 acquires the sound of which kind is same as that of the sound extracted by the characteristic sound extraction section 694 from the sound database for storing plural kinds of sounds therein. Specifically, the sound acquiring section 696 acquires the music identical to the sound extracted by the characteristic sound extraction section 694 from the sound database 172. The sound acquiring section 696 acquires the music having note data corresponding to the note data extracted by the characteristic sound extraction section 694 from the sound database 172. At this time, the sound acquiring section 696 may detect the image capturing position and the image-capturing time of the image capturing apparatus 600 at the timing at which the image capturing apparatus 602 captures the image and acquire the music identical to the music extracted by the characteristic sound extraction section 694 among the music data stored in the sound database 172 in association with the broadcasting position including the image capturing position and the broadcasting time including the image capturing time. At this time, the sound acquiring section 696 may preferentially retrieve the music with higher hit degree in the area including the image capturing position and the age including the image capturing time and acquire the same. Additionally, the sound acquiring section 696 may identify the broadcasting means from which the music should be broadcasted based on the image capturing position and retrieve preferentially the music broadcasted by the broadcasting means. For example, the sound acquiring section 696 sequentially retrieve the sound should be broadcasted through a radio on a preferential basis when the sound acquiring section 696 acquires the sound recorded in a residential area. Meanwhile the sound acquiring section 696 sequentially retrieve the sound should be cable-broadcasted on a preferential basis when the sound acquiring section 696 acquires the sound recorded in an amusement park.

The sound acquiring section 696 acquires the music of which kind is same as that of the music extracted by the characteristic sound extraction section 694 from the music database 172 for storing plural pieces of music therein. Specifically, the sound acquiring section 696 acquires the music in the age same as that of the music extracted by the characteristic sound extraction section 694 from the music database 172. Additionally, the sound acquiring section 696 acquires the music in the genre same as that of the music extracted by the characteristic sound extraction section 694. Specifically, the sound acquiring section 696 identifies the genre and or age of the music based on the amount of characteristic, such as rhythm, tempo, tonality and chord progression extracted by the characteristic sound extraction section 694 and acquires the music in the identified genre and/or age from the sound database 172. Additionally, the sound acquiring section 696 may retrieve the music having the amount of characteristic from the sound database 172 based on the amount of characteristic extracted by the characteristic sound extraction section 694 and identify the persons associated with the music to acquire the music associated with the identified persons from the music database 172. Here, the sound acquiring section 696 may acquire the music having the highest hit degree in the area including the image capturing position and the period including the image capturing time among the music data stored in the music database 172.

Additionally, the sound acquiring section 696 acquires the environmental sound of which kind is same as that of the environmental sound extracted by the characteristic sound extraction section 694 from the environmental sound database 174. Here, when the condition storage section 660 stores an environmental sound in itself, the sound acquiring section 696 may acquire the sound of which kind is same as that of the sound extracted by the characteristic sound extraction section 694 from the condition storage section 660.

The data storage section 698 stores the sound acquired by the sound acquiring section 696 and the image captured by the image capturing section 602 in association with each other in order to synchronously put them. Specifically, the data storage section 698 stores the sound acquired by the sound acquiring section 696 and the image captured by the image capturing section 602 in association with each other in order to synchronously output them. Additionally, the data storage section 698 stores the environmental sound acquired by the sound acquiring section 696 and the image captured by the image capturing section 602 in association with each other in order to synchronously output them. As thus described above, the image capturing apparatus 600 can provide the music same as BGM surrounding the image capturing apparatus 600 at image-capturing by the image capturing apparatus 600 along with the image to the user 180. Additionally, the image capturing apparatus 600 can provide the environmental sound surrounding the image capturing apparatus 600 at image-capturing along with the image to the user 180.

FIG. 21 shows a table indicative of an example of data stored in a music database 172. The sound database 172 stores the age, the genre, the rhythm, tempo, tonality and chord progression of the music, note data indicative of the score, the recode company having the right of master, production label the hit degree and music IDs for identifying music in association with music data (music data table 791). Here, the age stored in the music database 172 may the age in which the music is produced, the age in which the music is published, and the age in which the music is popular. Here, the music database 172 may be store various properties regarding the music, such as the producer who produce the music, the album including the music, accounting information for downloading the music in addition to the properties shown in FIG. 21, of course.

Additionally, the music database 172 stores, in association with play list IDs for identifying play lists, a plurality of music IDs for identifying each of a creator ID for identifying the creator of the play list, selection frequency at which the play list is selected, the recommendation degree of the play list and plural pieces of music included in the play list, and the order of reproducing the music (play list information 792). Here, the play list may be a collection of plural pieces of music. Specifically, the play list may be a collection including a series of pieces of music to be continuously reproduced. For example, the play list may be a series of pieces of music used in a broadcast such as a radio broadcast and a cable broadcast. Additionally, the play list may be a collection including plural pieces of music having the similar attribute. For example, the play list may be a collection including plural pieces of music which have similar musical feature (rhythm, tempo and chord progression) and which are released from the same label. Additionally, the creator of the play list is fallen into the concept of various play list sources providing the play list, such as a person including the user 180, a corporation including a television station, a radio station and a cable broadcast station, and channels of the TV, the radio and the cable broadcast.

Further, the music database 172 stores the selection frequency of music and the recommendation degree in association with the music ID (music recommendation degree information 793). Here, the image capturing apparatus 600 may include therein the play list information 792 and the music recommendation degree information 793.

Figure 22:
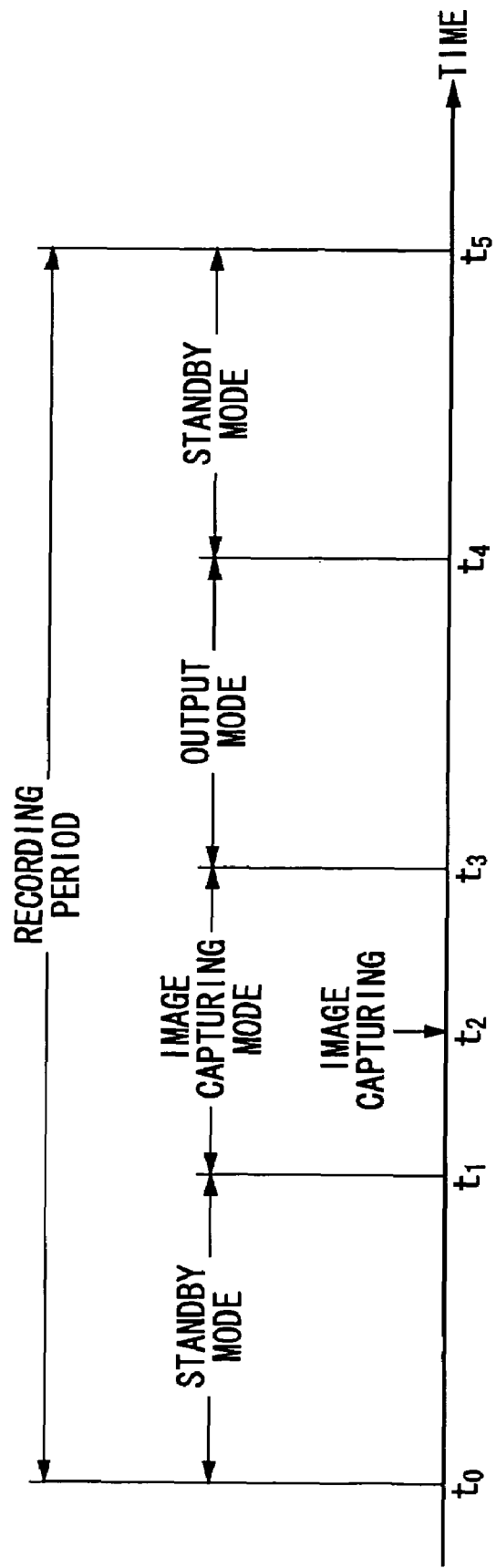
FIG. 22 shows an example of the relationship between the sound recorded by the image capturing apparatus 600 and the time range according to another embodiment of the present invention.

FIG. 22 shows an example of the relationship between the sound recorded by the image capturing apparatus 600 and the time range. The image capturing apparatus 600 has operation modes including an image capturing mode, an output mode and a standby mode. The image capturing mode may be an operation mode in which the image capturing mode can capture images and/or records sounds. The output mode may be an operation mode in which the image capturing apparatus 600 can output images and/or sound. Here, the output mode and the standby mode are included in a non-image capturing mode. Then, the image capturing apparatus 600 records the sounds surrounding thereof in a period (t1-t3) for which the image capturing apparatus is set to the image capturing mode, a period (t4-t5) for which the image capturing apparatus is set to the output mode and a period (t0-t1 and t4-t5) for which the image capturing apparatus is set to the image capturing mode.

Here, the operations of the image capturing apparatus 600 in each of the operation modes are same as the image capturing apparatus 100 described above, so that the description is omitted.

The characteristic sound extraction section 694 extracts the sound among the sounds recorded by the recording section 650 within the time range before/after an image capturing time t2 by a predetermined time. For example, when the user 180 instructs the image capturing apparatus 600 on capturing an image at the time t2 from the user 180, the characteristic sound extraction section 694 extracts the sound among the sounds recorded within the period for which the image capturing apparatus 650 is set to the standby mode or the output mode including the period (t1-t3) for which the image capturing apparatus is set to the image capturing mode including the image capturing time t2, such as a period (t0-t5).

Here, the characteristic sound extraction section 694 may extract the music from the sound recorded at the time proximate to the time t2 among the sounds recorded by the recording section 650 within the period (t0-t5) including the image capturing time t2. Additionally, the characteristic sound extraction section 694 may extract the music from the sound having the largest volume.

Figure 23:
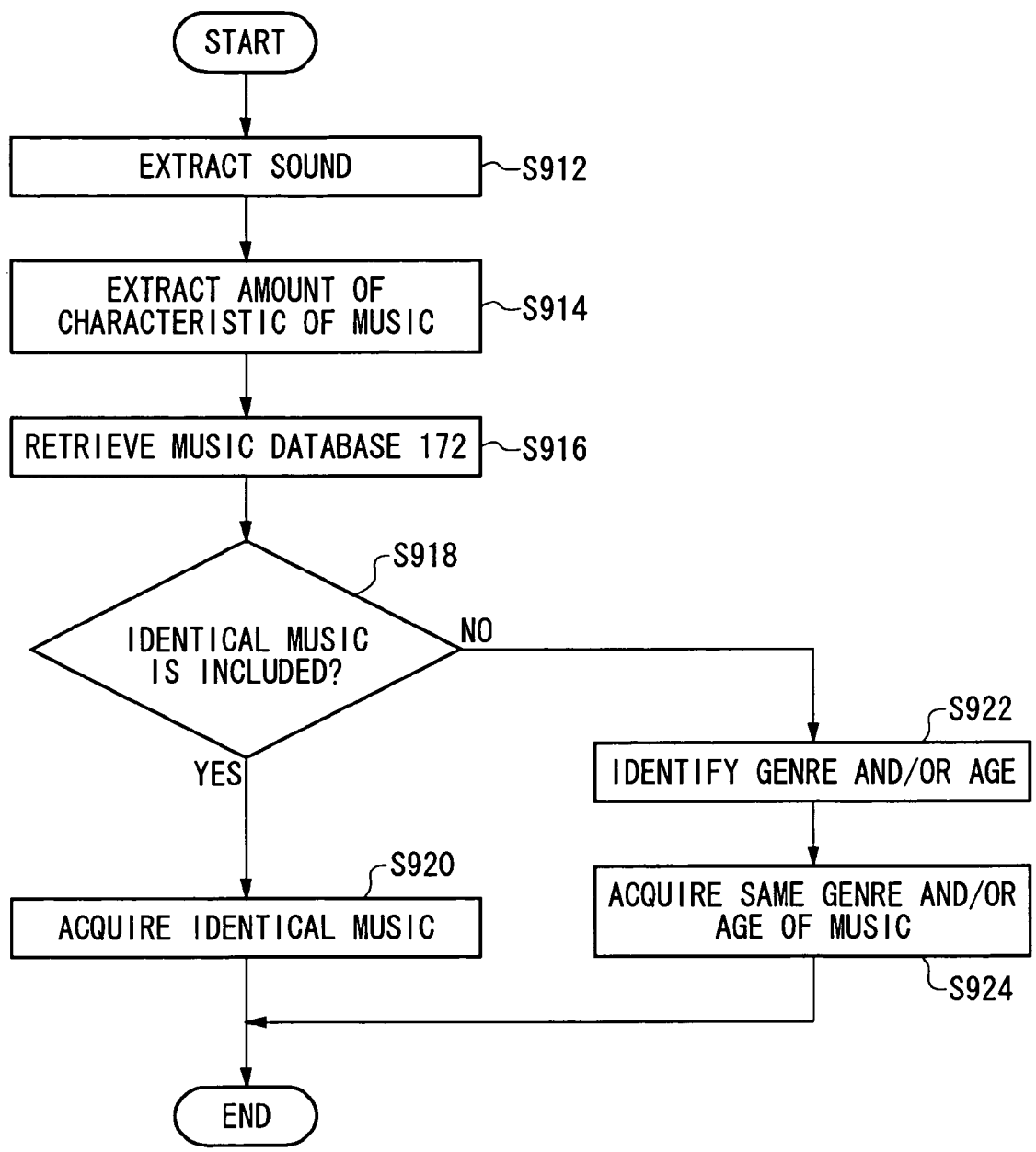
FIG. 23 shows an example of the procedure of acquiring music according to another embodiment of the present invention.

FIG. 23 shows an example of the procedure of acquiring music. The characteristic extraction section 694 extracts the sound within the period including the time at which the image is captured from the sounds recorded by the recording section 650 (S912). Then, characteristic extraction section 694 extracts the amount of characteristic of music from the sound within the period extracted in S912 (S914). The amount of characteristic of music may be note data, rhythm, tempo, tonality and code chord progression.

Then, the sound acquiring section 696 retrieves the music corresponding to the note data extracted by the characteristic sound extraction section 694 from the music database 172 (S916). Then, the characteristic extraction section 694 determines whether the music corresponding to the extracted note data is stored in the music database 172 (S918) The sound acquiring section 696 acquires the corresponding music from the music database 172 when it is determined that the corresponding music is stored in the music database 172 in S918.

When the sound acquiring section 696 determines that the corresponding music is not stored in the music database 172 in S918, it identifies the genre and/or sound same as the sound extracted in S912 based on the amount of characteristic of music extracted by the characteristic sound extraction section 694 in S914 (S922). For example, the sound acquiring section 696 identifies the genre and or age including the music having the most similar amount of characteristic among the music stored in the music database 172. Then, the sound acquiring section 696 acquires the music in the genre and/or age identified in S922 from the music stored in the music database 172 (S924). Additionally, the sound acquiring section 696 may identify the record company or the label stored in the music database 172 in association with the music having the most similar amount of characteristic in addition to the genre and the age in S922. Then, the sound acquiring section 696 may acquire the music of the record company or the label identified in S922 from the music stored in the music database 172. Here, when there are a plurality of same kind music in S924, the sound acquiring section 696 may acquire the music having the highest hit degree which stored in the music database 172.

Additionally, when plural pieces of music which are determined as the identical music in S918 are retrieved from the music database 172, the sound acquiring section 696 may acquire the plurality of retrieved identical music from the music database and causes the user 180 to make a selection. Additionally, the sound acquiring section 696 also may acquire the music in the same genre and/or the age which are acquired from the music database 172 and causes the user 180 to make a selection in S924. Additionally, the sound acquiring section 696 may acquire the music having the highest hit degree among the plural pieces of music stored in the music database 172. The sound acquiring section 696 may identify the record company or the label stored in the sound database 172 in association with the maximum number of music among a plurality of retrieved music when the plural pieces of music are retrieved. Then, the sound acquiring section 696 may acquire the music of the identified record company or the label in the age from the music stored in the music database 172. Here, in S920, the sound acquiring section 696 may acquire the music of the record company or the label same as the music which was identified as the identical music in S918. Further, the sound acquiring section 696 may acquire the music stored in the music database 172 in association with the property same as that of the music which was identified as the identical music in S918 from the music database 172 in addition to the record company and he label.

The data storage section 698 may record the image and plural pieces of music in order to reproduce the plural pieces of music included in the play list which includes the music acquired by the sound acquiring section 696 along with the image. Here, the sound acquiring section 696 extracts the play list ID stored as the play list information 792 in the music database 172 in association with the music ID for identifying the music acquired in S920 or S924. Then, the sound acquiring section 696 selects a plurality of music IDs stored as the play list information 792 in the music database 172 in association with the extracted play list IDs, and acquires plural pieces of music identified by each of the plurality of selected music IDs from the music data table 791 stored in the music database 172. Then, the data storage section 698 stores the plural pieces of music acquired by the sound acquiring section 696 in association with the images captured by the images capturing section 602 in order to simultaneously and continuously output the images and the plural pieces of music. Therefore, the image capturing apparatus 600 can record images and music in order that a series of pieces of music with the preferred combination are sequentially reproduced when the user 180 views the images.

Here, the sound acquiring section 696 previously stores the play list acquiring condition to acquire a plural pieces of music included in the play list. For example, the sound acquiring section 696 stores threshold sound volume which is the threshold value for the sound volume as the play list acquiring condition. Then, the sound acquiring section 696 may acquire the plural pieces of music included in the play list provided that the sound volume of the music extracted by the characteristic sound extraction section 694 is larger than the threshold sound volume previously stored in the sound acquiring section 696. Additionally, the sound acquiring section may store low noise, selection frequency and recommendation degree as the play list acquiring condition. Specifically, the sound acquiring section 696 previously stores the threshold value for the magnitude of noise, and may acquire the plural pieces of music included in the play list provided that the characteristic sound extraction section 694 extracts the music having the amount of noise less than the threshold value. Here, the amount of noise may be a value derived based on the difference between the sound waveform data of the music acquired by the sound acquiring section 696 and the sound waveform data of the music extracted by the characteristic sound extraction section 694. Additionally, the sound acquiring section 696 may extract the selection frequency or the recommendation degree stored as the music recommendation degree information 793 in the music database 172 in association with the acquired music and acquire the plural pieces of music included in the play list provided that the extracted selection frequency or recommendation degree is more than a predetermined reference value.

Here, the selection frequency may be an index indicative of the number of times at which the music acquired by the sound acquiring section 696 is selected. The image capturing apparatus 600 sends information indicating that the music is acquired to the music database 172, and then, the music database 172 adds the selection frequency stored in the music recommendation degree information 793 in association with the acquired music. Additionally, the selection frequency may be an index indicative of the number of times at which the image capturing apparatus 600 reproduces the music when the image capturing apparatus 600 actually reproduces the music and the images. In this case, the selection frequency stored in the music recommendation degree information 793 is added in the image capturing apparatus every time the image capturing apparatus 600 reproduces the music. Here, the image capturing apparatus 600 may count the number of times at which the music is reproduced provided that the music is reproduced for a period longer than a predetermined length. For example, if the user 180 performs a fast-forward operation as soon as a music is reproduced, the image capturing apparatus 600 does not count the music as the reproduced music. Additionally, the sound acquiring section 696 may calculate the recommendation degree by itself based on the coincidence between the musical attribute, such as the favorite genre of the user 180, the record company, the label, the composer, the songwriter, the arranger, the player and the broadcasting means such as a radio, a cable broadcast or programs, and that of the music acquired by the sound acquiring section 696, and the hit degree. Here, each of the favorite attribute of the user 180 is previously stored in the image capturing apparatus 600.

The sound acquiring section 696 may preferentially select the play list including more plural pieces of acquired music and acquire the plural pieces of music included in the selected play list when the sound acquiring section 696 acquires plural pieces of music in S920 or S924. For example, the sound acquiring section 696 first preferentially selects the play list including all the acquired music. Additionally, the sound acquiring section 696 may preferentially select the play list including all the music which satisfy the above-described play list acquiring condition among the plural pieces of music acquired by the sound acquiring section 696 when the play list including all the acquired music is not stored in the play list information 792. Additionally, the sound acquiring section 696 may calculate the ratio between the number of music included in the play list among the acquired music and the total number of music included in the play list and preferentially select the play list of which ratio is larger.

The sound acquiring section 696 previously stores the play list selection condition to select at least one of play list among a plurality of play lists when the music acquired in S920 or S924 is included in the plurality of play lists. For example, the sound acquiring section 696 stores the play list selection condition indicating that the play list should be selected based on the selection frequency at which the play list is selected, the number of music which satisfies the above-described play list acquiring condition and the recommendation degree of the play list. Then, the sound acquiring section 696 may preferentially select the play list of which the selection frequency stored in the play list information 792 is larger, the play list including more pieces of music which satisfy the play list acquiring condition and the play list of which recommendation degree stored in the play list information 792 is larger. Additionally, the sound acquiring section 696 may preferentially select the play list created by the play list creator who is more preferred by the user 180. Here, the sound acquiring section 696 previously stores the preference degree of the user 180 regarding the play list creator for each play list creator ID. Then, the sound acquiring section 696 may preferentially select the play list associated with the play list creator ID which is more preferred by the user in the play list information 792.

Now, it is described that the operation of the image capturing apparatus 600 when plural pieces of music included in the play list selected by the sound acquiring section 696 are stored along with images. The sound acquiring section 696 acquires the other music included in the selected play list provided that the sound acquiring section 696 detects that the music extracted by the characteristic sound extraction section 694 is changed. At this time, the sound acquiring section 696 may select the music having the information thereof stored in the play list information 792 that it should be reproduced next to the music acquired immediately before that. Additionally, the sound acquiring section 696 may preferentially select the music having higher recommendation degree calculated from the play list acquiring condition. Further, the sound acquiring section 696 may select the music at random. At this time, the sound acquiring section 696 may preferentially select the music having less selection frequency. Here, the sound acquiring section 696 may calculate the amount of change of the scene among a plurality of images captured by the image capturing section 602 and acquire the other music stored in the selected play list provided that the calculated amount of change of the scene is larger than a predetermined reference value. Additionally, the sound acquiring section 696 may calculate the amount of change of the scene based on various indexes such as the amount of change of the average luminance or the luminance distribution, the amount of change of the average luminance per color component or the luminance distribution per color component, or the amount of change of the object included in the image.

Here, the sound acquiring section 696 may select a new play list and acquire plural pieces of music included in the selected play list provided that the sound acquiring section 696 detects that the sound extracted by the characteristic sound extraction section 694 is changed, or that the scene among the plurality of images is changes. Additionally, the sound acquiring section 696 may select a new play list provided that the sound acquiring section 696 acquires the predetermined number of music and that are stored in the data storage section 698. Additionally, the sound acquiring section 696 may select a new play list provided that the reproduction time of the music included in one play list which is continuously recorded on the data storage section 698 is longer than a predetermined reference value. Here, the sound acquiring section 696 may select a new play list based on the above-described play list selection condition. For example, the sound acquiring section 696 may preferentially select the play list having larger recommendation degree as the new play list.

The sound acquiring section 696 stores the determination condition to determine whether a new music is selected from the currently selected play list or a new play list is selected using a parameter being the change of music and the change of scene. Specifically, when the scene is changed, the sound acquiring section 696 stores the determination condition to select a new play list provided that the music is changed, and to select a new music among the currently selected play list provided that the music is not changed. Additionally, when the scene is not changed, the sound acquiring section 696 stores the determination condition to select a new music among the currently selected play list provided that the music is changed. Further, when both of the scene and the music are not changed, the sound acquiring section 696 stores the determination condition to select a new music in order to reproduce the new music at a timing allowing the same music to be continuously reproduced for a predetermined period.

The data storage section 698 may record a control signal indicating that the music to be reproduced is faded out at the timing before a switching timing at which a new music is reproduced by a predetermined time interval when plural pieces of music are stored in order to be continuously reproduced. Additionally, the data storage section 698 may record the control signal indicating that the new music is faded in for the period after the switching timing by a predetermined time interval. Further, the data storage section 698 may record the control signal indicating that the music reproduced before the switching timing and the music newly reproduced are cross-faded for a period with a predetermined time interval before and after the switching timing including the switching timing.

As described above, the image capturing apparatus 600 can select plural pieces of music in the play list including the music extracted from the environmental sound and reproduce the same along with the images. Therefore, the image capturing apparatus 600 can reproduce a series of music which are the music related to the environmental sound at capturing the image and which are preferred by the user 180 along with the images.

Hereinbefore, the operation that the sound acquiring section 696 acquires music from the music database 172 with reference to FIGS. 21 to 23. Additionally the sound acquiring section 696 can acquire environmental sounds through an operation same as the above. Further, the sound acquiring section 696 can various kinds of sounds which should be recorded in association with the images in addition to the music and the environmental sound, of course.

Figure 24:
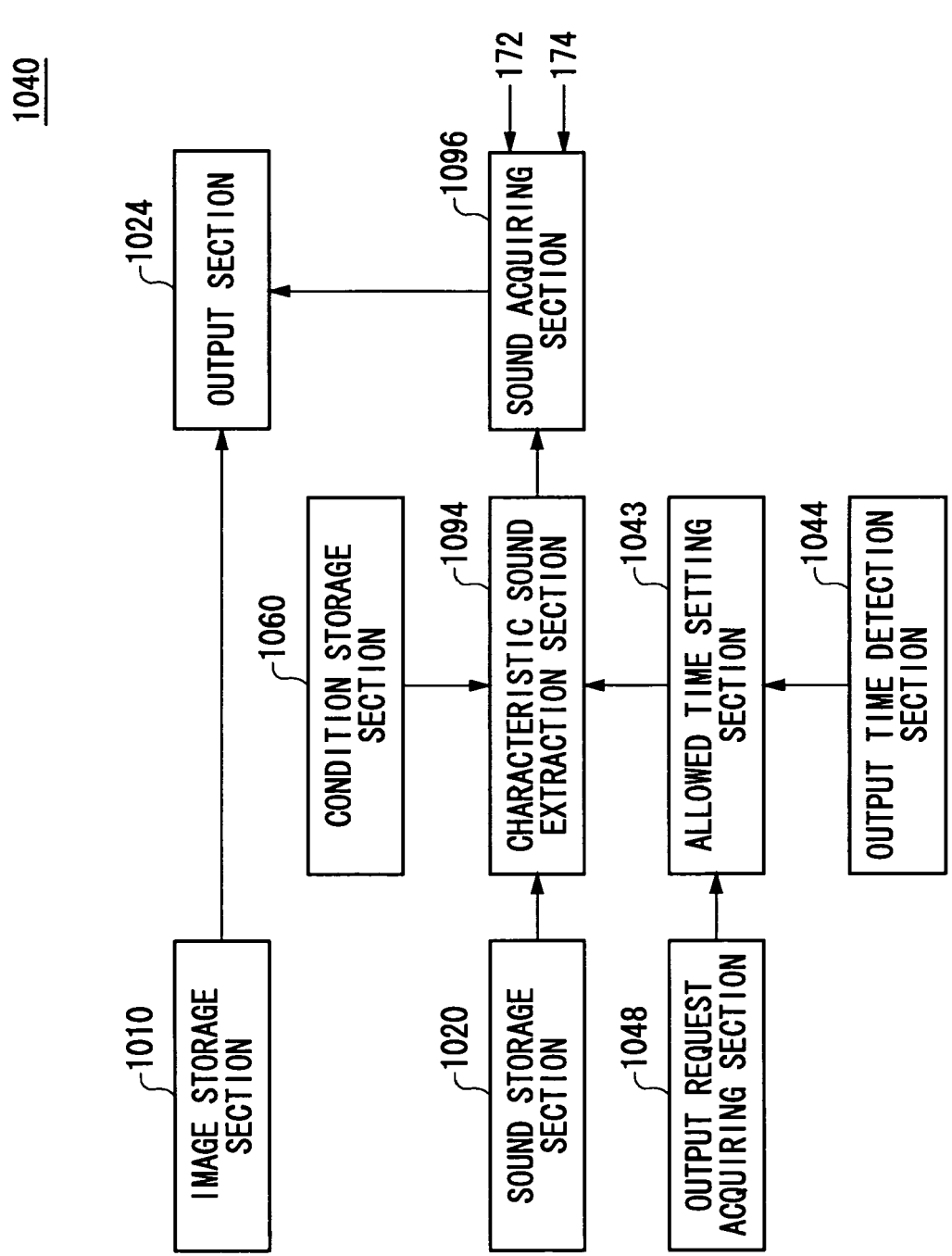
FIG. 24 shows an example of a block configuration of an output apparatus 1040 according to another embodiment of the present invention.

FIG. 24 shows an example of a block configuration of an output apparatus 1040. The output apparatus 1040 may be another example of the output apparatus 140 included in the sound provision system. Here, the image capturing apparatus 100 transmits the time at which the sound surrounding thereof is recorded in addition to the captured image and the surrounding sound at the image-capturing.

The output apparatus 140 includes an image storing section 1010, an output section 1024, a sound acquiring section 1096, a characteristic sound extraction section 1094, a condition storage section 1060, a sound storage section 1020, an allowed time setting section 1043, an output time detection section 1044 and an output request acquiring section 1048.

The image storage section 1010 stores the image captured by the image acquiring section 100. The image storage section stores the time at which the image is captured in association with the image.

The sound storage section 1020 stores the sound recorded by the image capturing section 100. The sound storage section 1020 stores the time at which the sound is recorded in association with the sound. Specifically, the sound storage section 1020 stores the sound surrounding the image capturing apparatus 100. Here, the recording time may be a time at which the recording is started and may be a time at which the recording is terminated.

The characteristic sound extraction section 1094 extracts a predetermined kind of sound from the sounds stored in the sound storage section 1020. Specifically, the sound acquiring section 1096 acquired the sound of which kind is same as the sound extracted by the characteristic sound extraction section 1094. For example, the characteristic sound extraction section 1094 extracts the sound from the sounds stored in the sound storage section 1020. Then, the sound acquiring section 1096 acquires the music of which kind is same as that of the sound extracted by the characteristic sound extraction section 1094. Additionally, the sound acquiring section 1096 acquires the environmental sound of which kind is the same as that of the environmental sound extracted by the characteristic sound extraction section 1094. Here, the concrete operation that the sound acquiring section 1096 acquires a sound or an environmental sound is same as the operation of the sound acquiring section 696 described above with reference to FIG. 9, so that the description is omitted.

The output request acquiring section 1048 acquires a request for outputting the image stored in the image storage section 1010. The allowed time setting section 1043 sets an allowed time which is the period for which a sound is captured to be longer when the difference between the time at which the output request acquiring section 1048 acquires the output request and the image capturing time of the image stored in the image storage section 1010 is larger. Then, the characteristic sound extraction section 1094 extracts the music from the sounds recorded within a predetermined allowed time since the image is captured. The output section 1024 synchronously outputs the sound acquired by the sound acquiring section 1096 and the image stored in the image storage section 1010. Specifically, the output section 1024 synchronously outputs the music or environmental sound acquired by the sound acquiring section 1096 and the image stored in the image storage section 1010.

The output apparatus 1040 according to the present embodiment can provide the captured image along with the sound put on at the time at which the image was captured, such as the popular music at that time to the user 180.

Figure 25:
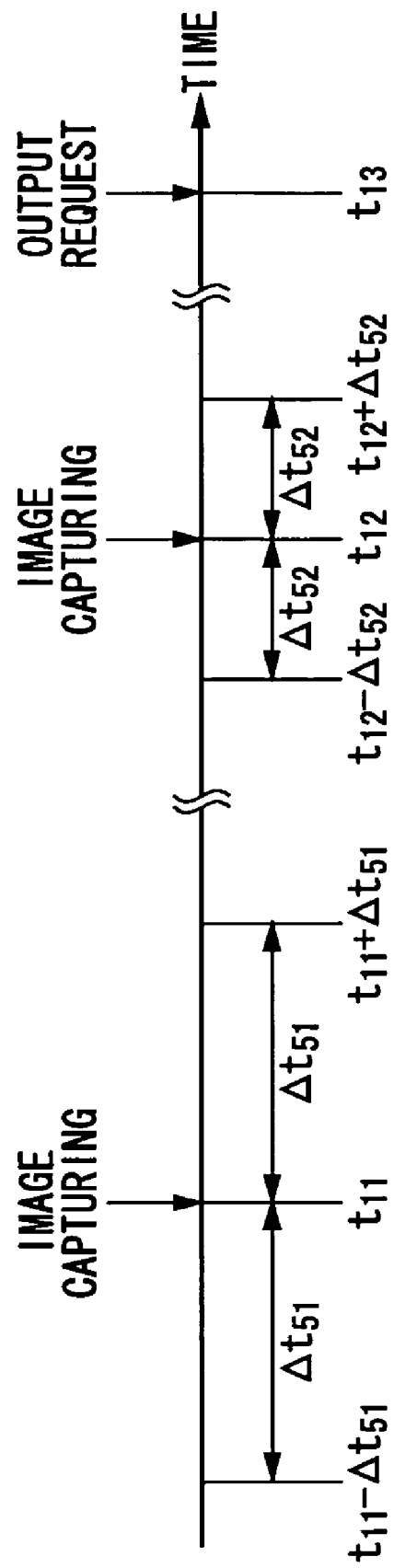
FIG. 25 shows an example of an allowed time according to another embodiment of the present invention.

FIG. 25 shows an example of an allowed time set by the allowed time setting section 1043. For example, on receiving from the user 180 at a time t13 an instruction on outputting the image captured at a time t12, the allowed time setting section 1043 determines a tolerance $\Delta t52$ for which the characteristic sound extraction section 1094 extracts music base on a difference between the time at which the instructed output time and the time at which the image to be outputted is captured (t13-t12). Then, the characteristic sound extraction section 1094 extracts the music from the sound recorded within the time range before/after the time t12 by the $\Delta t52$ (the time t12-$\Delta t52$~the time t12+$\Delta t52$) among the sounds stored in the sound storage section 1020.

Here, the characteristic sound extraction section 1094 may extracts the sound from the sounds recorded within a period from a time before the time t12 by the$\Delta t52$ to the time t12.

Alternatively, the characteristic sound extraction section 1094 may extracts the sound from the sounds recorded within a period from the time 12 to a time after the time t12 by the∆t52.

Additionally, the allowed time setting section 1043 sets the allowed time to be larger in proportion to the magnitude of the difference between the time at which the captured image stored in the image storage section 1010 is captured and the time at which the instruction on outputting is received. In FIG. 25, the allowed time setting section 1043 sets a tolerance ∆t51 longer than the tolerance ∆t52 when it receives at a time t 13 the instruction on outputting the image captured at a time t11 before the time t12. Then, the characteristic sound extraction section 1094 extracts music from the sound recorded within the time range from the time (t11−∆t51) to the time (t11+∆t51).

Here, the allowed time setting section 1043 may set a period obtained by dividing the period between the time at which the image is captured and the time at which the instruction on outputting is received by the predetermined number. In this case, the characteristic sound extraction section 1094 extracts music from the sound recorded before/after one day of the time at which the image is captured when the image captured ten days ago is outputted. Additionally, the sound extraction section 1094 extracts music from the sound recorded before/after one year of the time at which the image is captured when the image captured ten years ago is outputted.

As thus described above, the output apparatus 1040 can appropriately determine the music put on the location at which user 180 visited, such as a music in the car and a music of the cable broadcast in the souvenir shop in the sightseeing spot and download the music to reproduce along with the images. Additionally, the output apparatus 1040 can download the environmental sound of which kind is same as the environmental sound in the location at which the user 180 visited to reproduce along with the images. Further, the output apparatus 1040 selects the sound including the music and the environmental sound among the sounds recorded within wider time range including the time at which the images were captured when the images captured at the relatively past are outputted. Therefore, the user 180 can enjoyably appreciate the images as remembering the music which is the most popular music at that time.

Figure 26:
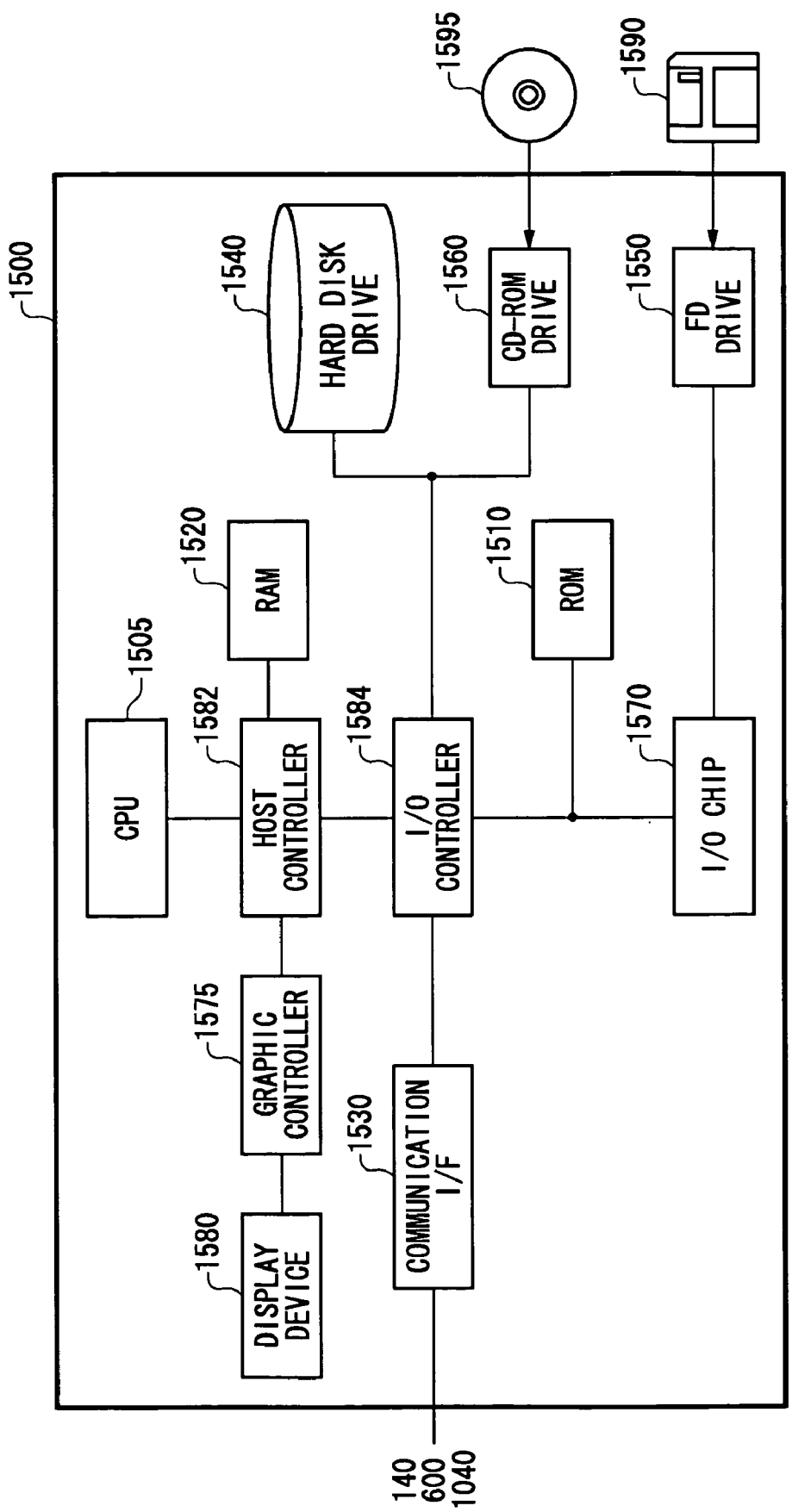
FIG. 26 shows an example of the hardware configuration of a computer 1500.

FIG. 26 shows an example of the hardware configuration of a computer 1500 involved in the image capturing apparatus 100 and the output apparatus 140. The computer 1500 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, a communication interface 1530 and a CD-ROM drive 1560 which are relatively high-speed input/output units. The hard disk drive 1540 stores the program and data used by the CPU 1505 of the computer 1500. The communication interface 1530 communicates with the output apparatus 140 through a network to provide the program or data to the output apparatus 140. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the computer 1500 at activating and a program depending on the hardware of the computer 1500. The flexible disk drive 1550 reads the program or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

The program provided to the communication interface 1530 through the RAM 1620 is stored in a recording medium, such as the flexible disk 1590, the CD-ROM 1595, or an IC card and provided by the user. The program is read from the recording medium, provided to the communication interface 1530 through the RAM 1520 and transmitted to the output apparatus 140 through the network. Then the program transmitted to the output apparatus 140 is installed in the output apparatus 140 and executed.

The program installed and executed in the output apparatus 140 operates the image capturing apparatus 100 as described above with reference to FIG. 1-FIG. 14. Additionally, the program installed and executed in the image capturing apparatus 100 operates the image capturing apparatus 100 as described above with reference to FIG. 1-FIG. 14.

The above-described program may be stored in an external storage medium. The external recording medium may be an optical storage medium such as a DVD and a PD, a magneto-optical recording medium such as a MD, a tape medium and a semiconductor memory such as an IC card. A storage medium such as a hard disk or a RAM which is provided in the server system connected to a private communication network or Internet is used as the recording medium to provide the program to the computer 1500 through the network.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An output apparatus comprising;
   an image storage section that stores a plurality of images which are captured;
   an image output control section that controls an image output section to output a particular image or particular images from the images stored in the image storage section;
   a sound storage section that stores a plurality of sounds which are recorded; and
   a sound output control section that selects a first sound among the plurality of sounds stored in the sound storage section and that controls a sound output section to output the first sound when the image output section outputs the particular image or particular images a first time and when the image output section is controlled by the image output control section to output the identical particular image at a time after the first time, the sound output control section selects a sound different from the first sound and controls the sound output section to output the sound different from the first sound.

2. The output apparatus according to claim 1, wherein the sound storage section stores the plurality of sounds recorded by a recording function of an image capturing apparatus which captures the plurality of images stored in the image capturing section.

3. The output apparatus according to claim 2, wherein the sound storage section stores the sound recorded by the recording function when the plurality of images stored in the image storage section are captured, and stores the sound recorded by the recording function when the plurality of images stored in the image storage section are not captured.

4. The output apparatus according to claim 2, wherein the sound storage section stores the plurality of sounds recorded within a recording period equal to or longer than an image capturing period including a plurality of times at which each of the plurality of images stored in the image storage section are captured.

5. The output apparatus according to claim 1, wherein the total time of the plurality of sounds stored in the sound storage section is longer than a time obtained by multiplying a preset output time at which the image output section outputs one image by the number of the plurality of images stored in the image storage section.

6. The output apparatus according to claim 1, wherein the image storage section stores information indicative of the timings at which the plurality of images are captured in association with each of the plurality of images, respectively, the sound storage section stores information indicative of the timings at which the plurality of sounds are recorded in association with each of the plurality of sounds, respectively, and the sound output control section sequentially selects the sound in the order corresponding to the recording timing close to the image-capturing timing.

7. The output apparatus according to claim 6, wherein the image storage section stores the times at which the plurality of images are captured in association with each of the plurality of images, respectively, the sound storage section stores the times at which the plurality of sounds are recorded in association with each of the plurality of sounds, respectively, and the sound output control section sequentially selects the sound in the order corresponding to the recording time close to the image-capturing time.

8. The output apparatus according to claim 1, wherein the sound output control section selects the sound different from the first sound in descending order of the volume.

9. The output apparatus according to claim 1 further comprising:
an output number of times holding section for counting the output number of times at which the plurality of sounds stored in the sound storage section are outputted by the sound output section and holding the same; and
a target number of times storage section for storing the target number of times at which the plurality of sounds stored in the sound storage section should be outputted by the sound output section, wherein
the sound output control section selects the sound descending order of the value obtained by subtracting the output number of times from the target number of times.

10. The output apparatus according to claim 1 further comprising:
an output number of times holding section for counting the output number of times at which the plurality of sounds stored in the sound storage section are outputted by the sound output section and holding the same; and
an output ratio storage section for storing the output ratio that the plurality of sounds stored in the sound storage section should be outputted by the sound output section, wherein
the sound output control section selects the sound in order that the ratio of the output number of times held by the output number of times holding section is close to the output ratio stored in the output ratio storage section.

11. The output apparatus according to claim 2, wherein the sound storage section stores each of the plurality of sound recorded by the recording function in both of the case that an image capturing mode in which the image capturing apparatus accepts an image capturing operation and the case that a non-image capturing mode in which the image capturing apparatus does not accept an image capturing operation in association with the operation mode at which the sound is recorded, and
the sound output control section preferentially selects the sound recorded at the time at which the image capturing apparatus is in the image capturing mode than the sound recorded at the time at which the image capturing apparatus is in the non-image capturing mode.

12. The output apparatus according to claim 1 further comprising a limited number of times storage section for counting the limited number of times and storing the same in the case that an output of sound is limited when the sound stored in the sound storage section is outputted from the sound output section, wherein
the sound output control section preferentially selects the sound stored in the limited number of times storage section at lesser number of times.

13. The output apparatus according to claim 1 further comprising:
an output instruction reception section for receiving an instruction on outputting the plurality of images stored in the image storage section by the image output section; and
an output time detection section for detecting a time at which the output instruction reception section receives the instruction, wherein
the image storage section stores the times at which the plurality of images are captured in association with each of the plurality of images,
the sound storage section stores the times at which the plurality of sounds are recorded in association with each of the plurality of sounds, and
the sound output control section sets a tolerance of the difference between the times at which the plurality of images stored in the image storage section are captured and the times at which the sound selected from the plurality of sounds stored in the sound storage section is recorded based on the difference between the time detected by the output time detection section and the times at which the plurality of images stored in the image storing section are captured.

14. The output apparatus according to claim 13, wherein the sound output control section sets the tolerance of the difference between the times at which the plurality of images stored in the image storage section are captured and the time at which the sound selected from the plurality of sounds stored in the sound storage section is recorded when the difference between the time detected by the output time detection section and the times at which the plurality of images stored in the image storing section are captured is larger.

15. An output method comprising:

storing a plurality of captured images in an image store;

controlling an output of the captured images stored in the image store so as to select a particular captured image or particular captured images for output from the image store;

storing a plurality of sounds associated with the captured images in a sound store; and selecting a first sound associated with the particular captured image or particular captured images from among the plurality of sounds stored in the sound store and controlling an output of the first sound from the sound store when the particular captured image or particular captured images are being output from the image store for the first time, and alternatively selecting a sound associated with the particular captured image or particular captured images different from the first sound from among the plurality of sounds stored in the sound store and outputting the sound different from the first sound from the sound store when the particular captured image or particular captured images are output from the image store at a time after the first time.

16. A computer readable medium storing a program for an output apparatus for outputting images, the program operates the output apparatus to function as:

an image storage section that stores a plurality of images which are captured;

an image output control section that controls an image output section to output a particular image or particular images from the images stored in the image storage section;

a sound storage section that stores a plurality of sounds which are recorded; and a sound output control section that selects a first sound among the plurality of sounds stored in the sound storage section and that controls a sound output section to output the first sound when the image output section outputs the particular image or particular images a first time and when the image output section is controlled by the image output control section to output the identical particular image or particular images at a time after the first time, the sound output control section selects a sound different from the first sound and controls the sound output section to output the sound different from the first sound.

* * * * *